United States Patent
Park et al.

(10) Patent No.: US 10,572,413 B2
(45) Date of Patent: Feb. 25, 2020

(54) ELECTRONIC DEVICE PROVIDING BYPASS PATH TO INDIRECTLY CONNECTED STORAGE DEVICE AMONG SERIALLY CONNECTED STORAGE DEVICES, STORAGE DEVICE INCLUDED THEREIN, COMPUTING SYSTEM INCLUDING THE SAME, AND METHOD OF COMMUNICATING THEREWITH

(71) Applicant: Samsung Electronics Co., Ltd., Suwon-si, Gyeonggi-do (KR)

(72) Inventors: Hyuntae Park, Suwon-si (KR); Youngmin Lee, Seoul (KR); Sungho Seo, Seoul (KR); Hwaseok Oh, Yongin-si (KR); JinHyeok Choi, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/685,586

(22) Filed: Aug. 24, 2017

(65) Prior Publication Data

US 2018/0089116 A1 Mar. 29, 2018

(30) Foreign Application Priority Data

Sep. 27, 2016 (KR) .......................... 10-2016-0124232

(51) Int. Cl.
*G06F 13/28* (2006.01)
*G06F 11/30* (2006.01)
(Continued)

(52) U.S. Cl.
CPC .......... *G06F 13/28* (2013.01); *G06F 11/3034* (2013.01); *H04L 12/403* (2013.01);
(Continued)

(58) Field of Classification Search
CPC .................................................. G06F 13/4022
(Continued)

(56) References Cited

U.S. PATENT DOCUMENTS 5,357,621 A * 10/1994 Cox ..................... G06F 12/0669
711/172
7,308,524 B2 12/2007 Grundy et al.
(Continued)

*Primary Examiner* — Brian T Misiura
(74) *Attorney, Agent, or Firm* — Harness, Dickey & Pierce, P.L.C.

(57) ABSTRACT

According to at least some example embodiments of the inventive concepts, an electronic device includes an embedded storage device that is, configured to connect to a removable storage device, and configured to directly communicate with the removable storage device, when connected to the removable storage device; and an application processor connected to directly communicate with the embedded storage device and not directly connected with the removable storage device, wherein, the embedded storage device is configured to, in response to a disable command received from the application processor, decrease an amount of power supplied to all or some of circuits included in the embedded storage device, and provide a bypass path that is configured to transfer a normal command and data from the application processor to the removable storage device, when the removable storage device is connected to the bypass path.

17 Claims, 19 Drawing Sheets

(51) Int. Cl.
  *H04L 12/40* (2006.01)
  *H04L 12/403* (2006.01)
  *H04L 29/08* (2006.01)
  *G06F 12/1081* (2016.01)
  *H04L 1/18* (2006.01)

(52) U.S. Cl.
  CPC ...... *H04L 12/40019* (2013.01); *H04L 69/324* (2013.01); *G06F 12/1081* (2013.01); *H04L 1/1867* (2013.01)

(58) Field of Classification Search
  USPC .................................................. 710/316–317
  See application file for complete search history.

(56) References Cited

U.S. PATENT DOCUMENTS

| | | | |
|---|---|---|---|
| 7,562,271 B2* | 7/2009 | Shaeffer | G11C 5/025 714/724 |
| 7,679,133 B2 | 3/2010 | Son et al. | |
| 7,721,130 B2 | 5/2010 | Prete et al. | |
| 8,166,230 B2 | 4/2012 | Choi et al. | |
| 8,310,380 B2* | 11/2012 | Aria | G06F 3/017 341/20 |
| 8,417,864 B2 | 4/2013 | Sun et al. | |
| 8,510,494 B2* | 8/2013 | Pietri | G06F 13/4022 710/313 |
| 8,527,793 B2 | 9/2013 | Chan et al. | |
| 8,553,466 B2 | 10/2013 | Han et al. | |
| 8,554,863 B2 | 10/2013 | Toyama | |
| 8,559,235 B2 | 10/2013 | Yoon et al. | |
| 8,560,735 B2 | 10/2013 | Tsai et al. | |
| 8,615,277 B2 | 12/2013 | Yang et al. | |
| 8,630,182 B2 | 1/2014 | Radke et al. | |
| 8,654,587 B2 | 2/2014 | Yoon et al. | |
| 9,213,389 B2 | 12/2015 | Oh | |
| 9,501,437 B2* | 11/2016 | Chang | G06F 13/287 |
| 9,542,343 B2* | 1/2017 | Kim | G06F 13/1689 |
| 9,703,702 B2* | 7/2017 | Tam | G06F 12/08 |
| 9,728,526 B2* | 8/2017 | Tam | H01L 25/18 |
| 9,841,904 B2* | 12/2017 | Ping | G06F 3/061 |
| 2008/0201588 A1 | 8/2008 | Pyeon et al. | |
| 2009/0063786 A1* | 3/2009 | Oh | G06F 11/1068 711/148 |
| 2010/0030951 A1 | 2/2010 | Kim | |
| 2011/0233648 A1 | 9/2011 | Seol et al. | |
| 2013/0311696 A1 | 11/2013 | Huff et al. | |
| 2018/0081595 A1* | 3/2018 | Lee | G06F 3/0626 |
| 2018/0088854 A1* | 3/2018 | Noh | G06F 3/0634 |
| 2018/0090191 A1* | 3/2018 | Jeong | G11C 7/10 |
| 2018/0096711 A1* | 4/2018 | Seo | G11C 5/147 |

* cited by examiner

ELECTRONIC DEVICE PROVIDING BYPASS PATH TO INDIRECTLY CONNECTED STORAGE DEVICE AMONG SERIALLY CONNECTED STORAGE DEVICES, STORAGE DEVICE INCLUDED THEREIN, COMPUTING SYSTEM INCLUDING THE SAME, AND METHOD OF COMMUNICATING THEREWITH

CROSS-REFERENCE TO RELATED APPLICATIONS

The present application claims priority under 35 U.S.C. § 119 to Korean Patent Application No. 10-2016-0124232 filed on Sep. 27, 2016, in Korean Intellectual Property Office, the entire contents of which are incorporated herein by reference.

BACKGROUND

1. Field

At least some example embodiments of the inventive concepts relate to communication between electronic circuits or devices, and more particularly, relate to configurations and operations of transferring packets and information for an interface between the electronic circuits or devices.

2. Related Art

Nowadays, various kinds of electronic devices are being used. An electronic device performs functions based on operations of various electronic circuits included therein. The electronic device performs functions to provide services to a user. The electronic device may operate solely to provide the services. Some electronic devices may communicate with other electronic devices or external electronic circuits to provide the services.

An operation processor and a storage device are some examples of electronic devices. For example, the operation processor may communicate (e.g., interface) with the storage device to provide a data storage service. The operation processor may exchange data/information/signals/packets with the storage device while interfacing with the storage device. The operation processor and the storage device may employ an interface protocol to communicate with each other.

As a demand for an electronic device having higher performance and efficiency increases, a configuration and an interface manner of the electronic device have been variously evolved. For example, various circuit configurations and operation methods have been developed to implement a storage device having a larger capacity. In some cases, however, changing a circuit configuration and an operation method to satisfy a user's demand may cause an increase in costs, configuration complexity, and a circuit area.

SUMMARY

According to at least some example embodiments of the inventive concepts, an electronic device includes an embedded storage device that is, configured to connect to a removable storage device, and configured to directly communicate with the removable storage device, when connected to the removable storage device; and an application processor connected to directly communicate with the embedded storage device and not directly connected with the removable storage device, wherein, the embedded storage device is configured to, in response to a disable command received from the application processor, decrease an amount of power supplied to all or some of circuits included in the embedded storage device, and provide a bypass path that is configured to transfer a normal command and data from the application processor to the removable storage device, when the removable storage device is connected to the bypass path.

According to at least some example embodiments of the inventive concepts, a storage device includes a controller configured to directly communicate with each of a host device and an external storage device, the host device and the external storage device not being directly connected to each other; a nonvolatile memory configured to store write data or output read data, under control of the controller; and switching logic configured such that, in response to an enable command from the host device, the switching logic selectively switches between providing a normal command and data received from the host device to the controller though a first path and providing the normal command the data received from the host device to the external storage device through a second path, wherein, the switching logic is further configured such that, in response to a disable command received from the host device, the switching logic disables at least one of the controller or the nonvolatile memory, and provides the normal command and the data to the external storage device through a third path different from the first and second paths.

According to at least some example embodiments of the inventive concepts, a computing system includes a plurality of electronic devices serially connected to each other through respective input/output ports thereof, the plurality of electronic devices comprising at least first and second electronic devices, the first electronic device being at a tail end of a serial connection, the second electronic device being connected to directly communicate with the first electronic device; and an operation processor device connected to directly communicate with the first storage device and not directly connected with the second storage device, wherein the first storage device is configured to receive a first normal command, which indicates an operation to be performed on an electronic device other than the first electronic device, from the operation processor device; decrease, in response to a disable command received in connection with the first normal command, an amount of power consumed by the first electronic device; and bypass the first normal command to the second electronic device in response to the disable command, and wherein, when the first normal command indicates an operation to be performed on the second electronic device, the second electronic device is configured to perform an operation indicated by the first normal command which bypasses the first electronic device.

According to at least some example embodiments of the inventive concepts, a method of communicating between an operation processor device and a storage device that are connected to directly communicate with each other includes generating, by the operation processor device, a first command that is configured for an external storage device, the external storage device being connected with the storage device to directly communicate with the storage device and not directly connected with the operation processor device; generating, by the operation processor device, a second command in connection with the first command; receiving, by the storage device, the first command and the second command from the operation processor device; decreasing, by the storage device, an amount of power consumed in the storage device, in response to the second command; and bypassing, by the storage device, the first command to the external storage device, without determining whether the first command is configured for the storage device or for the external storage device, in response to the second command.

According to at least some example embodiments of the inventive concepts, an electronic device includes a processor; one or more first signal lines; a first storage device that includes one or more circuits and is connected to the processor by the one or more first signal lines; and one or more second signal lines that are connected to the first storage device and connectable to a second storage device, the first storage device including switching logic configured to selectively transfer signals received from the processor to a first path or a second path, the first path being connectable to the one or more circuits, the second path being connected to the one or more second signal lines, the first storage device being configured such that, based on receiving a disable command from the processor, the first storage device reduces an amount of power received by at least one of the one or more circuits, the switching logic selects the second path, and the switching logic transfers at least one of commands and data received from the processor to the second storage device through the second path, when the second storage device is connected to the one or more second signal lines.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
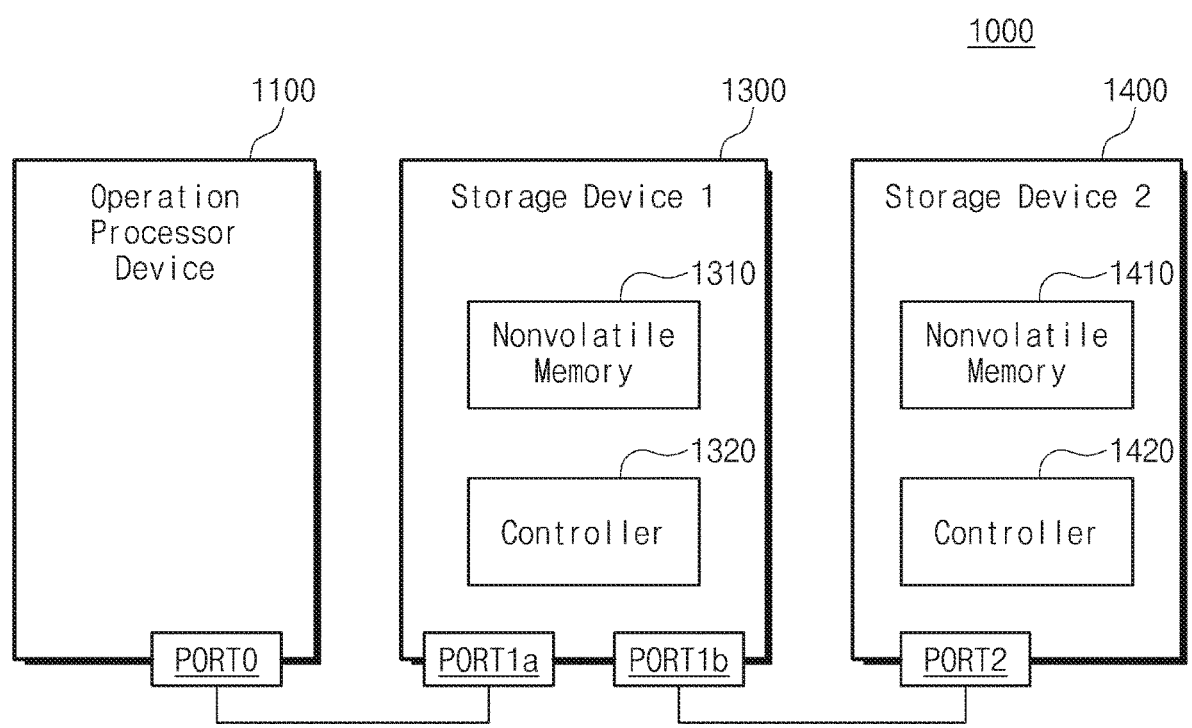
FIG. 1 is a block diagram illustrating a storage system that includes serially connected storage devices, according to at least some example embodiments of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram illustrating a storage system 1000 that includes serially connected storage devices 1300 and 1400, according to at least some example embodiments of the inventive concepts. The storage system 1000 may include an operation processor device 1100, a first storage device 1300, and a second storage device 1400.

The operation processor device 1100 may perform various arithmetic operations and/or logical operations to manage and process overall operations of the storage system 1000. For example, the operation processor device 1100 may be implemented in a special-purpose circuit (e.g., field programmable gate arrays (FPGA), application specific integrated circuits (ASICs), and/or the like) including one or more processor cores, or may be implemented in a system on chip (SoC). For example, the operation processor device 1100 may include a general-purpose processor, a special-purpose processor, and/or an application processor. The operation processor device 1100 may be a processor itself, or may be an electronic device or system including a processor. According to at least some example embodiments of the inventive concepts, a processor included in the operation processor device 1100 may be a microprocessor, a multi-processor, and/or a multicore processor.

The first storage device 1300 may include one or more nonvolatile memory 1310 and a controller 1320. The second storage device 1400 may include one or more nonvolatile memory 1410 and a controller 1420. Each of the nonvolatile memory 1310 and nonvolatile memory 1410 may include one or more individual memory modules.

The nonvolatile memory 1310 and 1410 may include memory areas for storing data. The nonvolatile memory 1310 and 1410 may each include one or more individual memory modules. For example, each of the nonvolatile memory 1310 and 1410 may include one or more of various nonvolatile memories including, for example, a NAND-type flash memory, a phase-change random access memory (PRAM), a magneto-resistive RAM (MRAM), a resistive RAM (ReRAM), a ferro-electric RAM (FRAM), and/or the like.

The controllers 1320 and 1420 may control overall operations of the storage devices 1300 and 1400 respectively. To this end, each of the controllers 1320 and 1420 may include one or more processors or processor cores and a buffer memory. For example, the controllers 1320 and 1420 may respectively control the nonvolatile memory 1310 and 1410 such that data is stored in the nonvolatile memory 1310 and 1410 or data stored in the nonvolatile memory 1310 and 1410 is output. According to at least some example embodiments of the inventive concepts, processors included in the controllers 1320 and 1420 may each be a microprocessor, a multi-processor, and/or a multicore processor.

The operation processor device 1100 may provide a command, a query, and/or a request to the storage devices 1300 and 1400. The operation processor device 1100 may exchange data with the storage devices 1300 and 1400. According to at least some example embodiments of the inventive concepts, commands, queries, requests, and data may be transferred in unit of a packet. However, at least some example embodiments of the inventive concepts are not limited thereto. The unit in which data is transferred may be variously changed or modified.

For example, when the operation processor device 1100 provides a write command and write data to the storage devices 1300 and 1400, the storage devices 1300 and 1400 may store the write data in the nonvolatile memory 1310 and 1410. For example, when the operation processor device 1100 provides a read command to the storage devices 1300 and 1400, the storage devices 1300 and 1400 may output read data, which is stored in the nonvolatile memory 1310 and 1410, to the operation processor device 1100.

The operation processor device 1100 may be a host device that is provided with a storage service from the storage devices 1300 and 1400. In the present disclosure, the term "host" may mean a device that is provided with a service by another device. A user of the storage system 1000 may be provided with the storage service as the operation processor device 1100 operates.

According to at least some example embodiments of the inventive concepts, the operation processor device 1100 and the storage devices 1300 and 1400 may be serially connected. Referring to FIG. 1, the operation processor device 1100 may be connected to directly communicate with the first storage device 1300 through ports PORT0 and PORT1*a*. In addition, the first storage device 1300 may be connected to directly communicate with the second storage device 1400 through ports PORT1*b* and PORT2. However, the operation processor device 1100 may not be directly connected with the second storage device 1400. For example, such connection between the operation processor device 1100 and the storage devices 1300 and 1400 may be understood as the topology of a "chain" structure or a "daisy-chain" structure.

For example, the controller 1320 may be configured to directly communicate with the operation processor device 1100 to exchange read data and write data with the operation processor device 1100. For example, the controllers 1320 and 1420 may be configured to directly communicate with each other to exchange read data and write data with each other. On the other hand, the controller 1420 may not be directly connected with the operation processor device 1100.

Unlike a configuration illustrated in FIG. 1, in some cases, the operation processor device 1100 may be directly connected with both the storage devices 1300 and 1400. For example, the storage devices 1300 and 1400 may be connected in parallel with the operation processor device 1100. In this case, however, the operation processor device 1100 may include multiple ports that are connected with both the storage devices 1300 and 1400. In addition, the operation processor device 1100 may include communication circuits to communicate with both the storage devices 1300 and 1400 and peripheral circuits driving/controlling the communication circuits.

On the other hand, according to at least some example embodiments of the inventive concepts, as is illustrated in FIG. 1, the operation processor device 1100 may not directly communicate with the second storage device 1400. Accordingly, the operation processor device 1100 may only include the port PORT0 connected with the first storage device 1300, a communication circuit to communicate with the first storage device 1300, and a peripheral circuit driving/controlling the communication circuit. Further, the first storage device 1300 may include the port PORT1*b* connected with the second storage device 1400, a communication circuit to communicate with the second storage device 1400, and a peripheral circuit driving/controlling the communication circuit.

Thus, according to at least some example embodiments of the inventive concepts, as is illustrated in FIG. 1, a configuration of the operation processor device 1100 may be simplified, and the area occupied by the operation processor device 1100 may decrease. Moreover, design/manufacturing costs of the operation processor device 1100 may decrease. In addition to such economic benefits, employing two storage devices 1300 and 1400 may provide a larger storage capacity in comparison to employing one storage device. Accordingly, a user's demand for data storage capacity may be satisfied.

In such the example embodiment, a configuration of the first storage device 1300 may become complicated somewhat. However, in many of cases, the operation processor device 1100 may operate at a speed of several or tens gigahertz (GHz), and the first storage device 1300 may operate at a speed of tens to hundreds megahertz (MHz). In addition, a process of manufacturing the operation processor device 1100 may be more difficult and complex than a process of manufacturing the first storage device 1300. Accordingly, it may be simpler and more economical to implement the port PORT1*b*, the communication circuit, and the peripheral circuit in the first storage device 1300 in comparison to manufacturing the operation processor device 1100 with multiple ports and other circuits for communicating, directly, with multiple storage devices.

The operation processor device 1100 and the storage devices 1300 and 1400 may communicate with each other in compliance with one or more of various interface protocols. For example, the operation processor device 1100 and the storage devices 1300 and 1400 may employ at least one of interface protocols such as peripheral component interconnect express (PCIe), serial advanced technology attachment (SATA), and/or the like, at an interconnect layer, to communicate with each other. For example, the operation processor device 1100 and the storage devices 1300 and 1400 may employ at least one of communication protocols such as small computer system interface (SCSI), nonvolatile memory express (NVMe), and/or the like, at an application layer, to communicate with each other. For example, the operation processor device 1100 and the storage devices 1300 and 1400 may employ at least one of interface protocols such as universal serial bus (USB), serial attached SCSI (SAS), Secure Digital (SD) card, embedded multimedia card (eMMC), universal flash storage (UFS), and/or the like, over the interconnect layer and the application layer, to communicate with each other. However, the above examples are not intended to limit the present disclosure.

FIGS. 2A to 2D are conceptual diagrams illustrating example implementations of the storage system 1000 of FIG. 1.

Figure 2A:
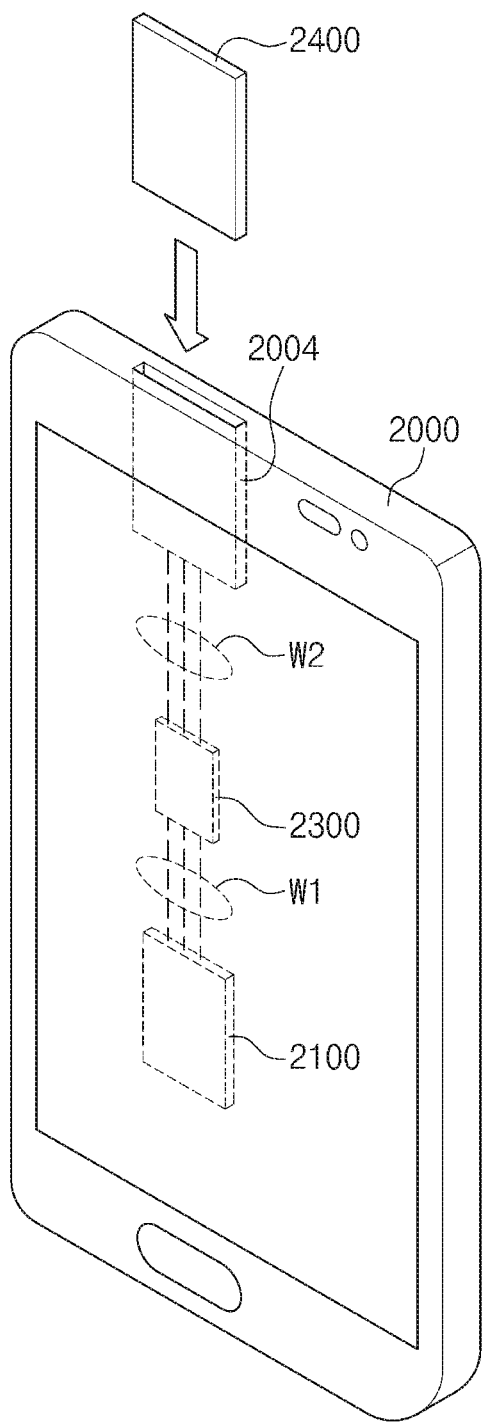
FIGS. 2A to 2D are conceptual diagrams illustrating example implementations of a storage system of FIG. 1.

Referring to FIG. 2A, the storage system 1000 of FIG. 1 may be implemented in an electronic device 2000 (e.g., a smart phone or a tablet computer). The electronic device 2000 may include an application processor 2100 and an embedded storage device 2300. The electronic device 2000 may include a slot 2004 to equip a removable storage device 2400. For example, the removable storage device 2400 may be implemented in the form of a card, a stick, or a chip package, and may be equipped in or detached from the slot 2004.

For example, the application processor 2100 may be connected to directly communicate with the embedded storage device 2300 through a conductive pattern W1. According to at least some example embodiments, the term "conductive pattern" may refer to a pattern of electrically conductive material that embodies, for example, one or more signal lines for transmitting signals (e.g., commands and/or data). When the removable storage device 2400 is equipped in the slot 2004, the embedded storage device 2300 may be connected to directly communicate with the removable storage device 2400 through a conductive pattern W2. On the other hand, the removable storage device 2400 may not be directly connected with the application processor 2100.

Figure 2B:
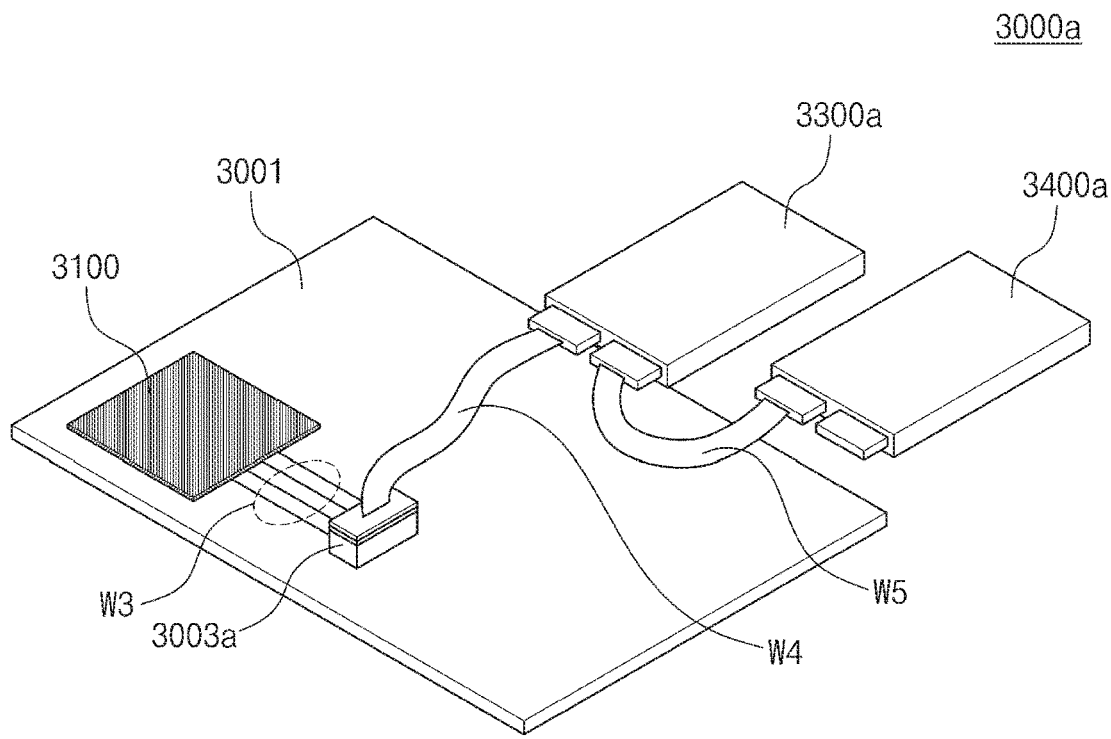
Figure 2C:
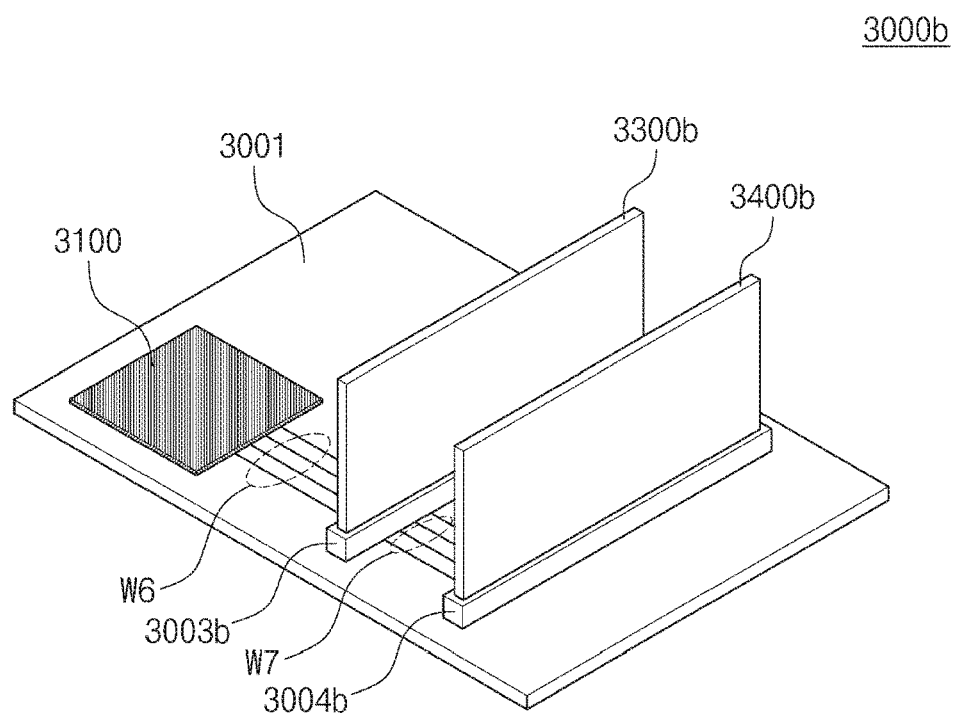
Figure 2D:
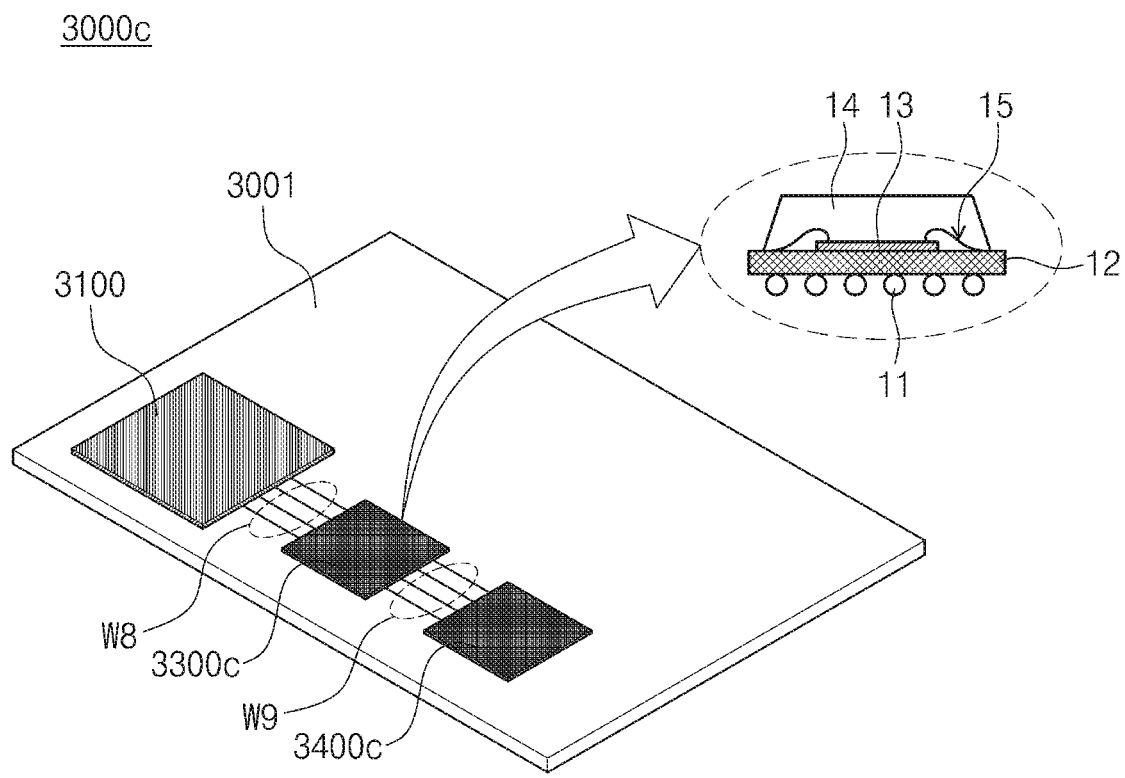

Referring to FIGS. 2B to 2D, the storage system 1000 of FIG. 1 may be implemented in a computing system 3000*a*, 3000*b*, or 3000*c* (e.g., a desktop computer, a laptop computer, a workstation, a server system, or the like). The computing system 3000*a* of FIG. 2B may include a central processing unit (CPU) 3100 and storage devices 3300*a* and 3400*a*. The CPU 3100 may be equipped on a main board (or a mother board) 3001.

For example, each of the storage devices 3300*a* and 3400*a* may be a hard disk drive (HDD) or solid state drive (SSD) that is implemented in a box module. A first storage device 3300*a* may be connected with a connector 3003*a* on the main board 3001, and may be connected to directly communicate with the CPU 3100 through a conductive pattern W3 and a wire cable W4. A second storage device 3400*a* may be connected to directly communicate with the first storage device 3300*a* through a wire cable W5. According to at least some example embodiments of the inventive concepts, wire cable W4 and wire cable W5 may each include one or more signal lines. On the other hand, according to at least some example embodiments of the inventive concepts, the second storage device 3400*a* may not be directly connected with the CPU 3100.

The computing system 3000*b* of FIG. 2C may include the CPU 3100 and storage devices 3300*b* and 3400*b*. For example, each of the storage devices 3300*b* and 3400*b* may be a memory module or SSD that is implemented in a card module. A first storage device 3300*b* may be connected with a connector 3003*b* on the main board 3001, and may be connected to directly communicate with the CPU 3100 through a conductive pattern W6. A second storage device 3400*b* may be connected with a connector 3004*b* on the main board 3001, and may be connected to directly communicate with the first storage device 3300*b* through a conductive pattern W7. On the other hand, the second storage device 3400*b* may not be directly connected with the CPU 3100.

The computing system 3000*c* of FIG. 2D may include the CPU 3100 and storage devices 3300*c* and 3400*c*. For example, each of the storage devices 3300*c* and 3400*c* may be an on-board SSD or a ball grid array (BGA) SSD that is implemented in a chip or a chip package. A first storage device 3300*c* may be connected to directly communicate with the CPU 3100 through a conductive pattern W8, and may be connected to directly communicate with a second storage device 3400*c* through a conductive pattern W9. On the other hand, the second storage device 3400*c* may not be directly connected with the CPU 3100.

For example, when the first storage device 3300*c* is a BGA SSD, the first storage device 3300*c* may include a nonvolatile memory/controller chip 13 that is mounted on a substrate 12. The nonvolatile memory/controller chip 13 may be connected with the conductive patterns W8 and W9 through a bonding 15, and may be covered with a mold compound 14. The first storage device 3300*c* may be equipped on the main board 3001 through solder balls 11.

According to at least some example embodiments of the inventive concepts, each of the computing systems 3000*a*, 3000*b*, and 3000*c* may further include a working memory that temporarily stores data processed or to be processed by the CPU 3100, a communication circuit to communicate with an external device/system, and a user interface to exchange data/information with a user. The working memory, the communication circuit, and the user interface may be equipped or mounted on the main board 3001, and may be connected with the CPU 3100 through conductive patterns and/or buses.

In FIGS. 2A to 2D, each of the application processor 2100 and the CPU 3100 may correspond to the operation processor device 1100 of FIG. 1. Each of the embedded storage device 2300 and the first storage devices 3300*a*, 3300*b*, and 3300*c* may correspond to the first storage device 1300 of FIG. 1. Each of the removable storage device 2400 and the second storage devices 3400*a*, 3400*b*, and 3400*c* may correspond to the second storage device 1400 of FIG. 2. As described with reference to FIG. 1, the configurations of FIGS. 2A to 2D may satisfy a user's demand, and may also bring economic benefits.

For example, each of the conductive patterns W1, W2, W3, W6, W7, W8, and W9 may be a conductive material formed on a printed circuit board (PCB) or the main board 3001. For example, each of the conductive patterns W1, W2, W3, W6, W7, W8, and W9 may include a wire pattern, a trace pattern, and/or the like. For example, the conductive material may be implemented with a wire, a trace, a conductive plate, and/or the like. However, these examples are not intended to limit the present disclosure.

Figure 3:
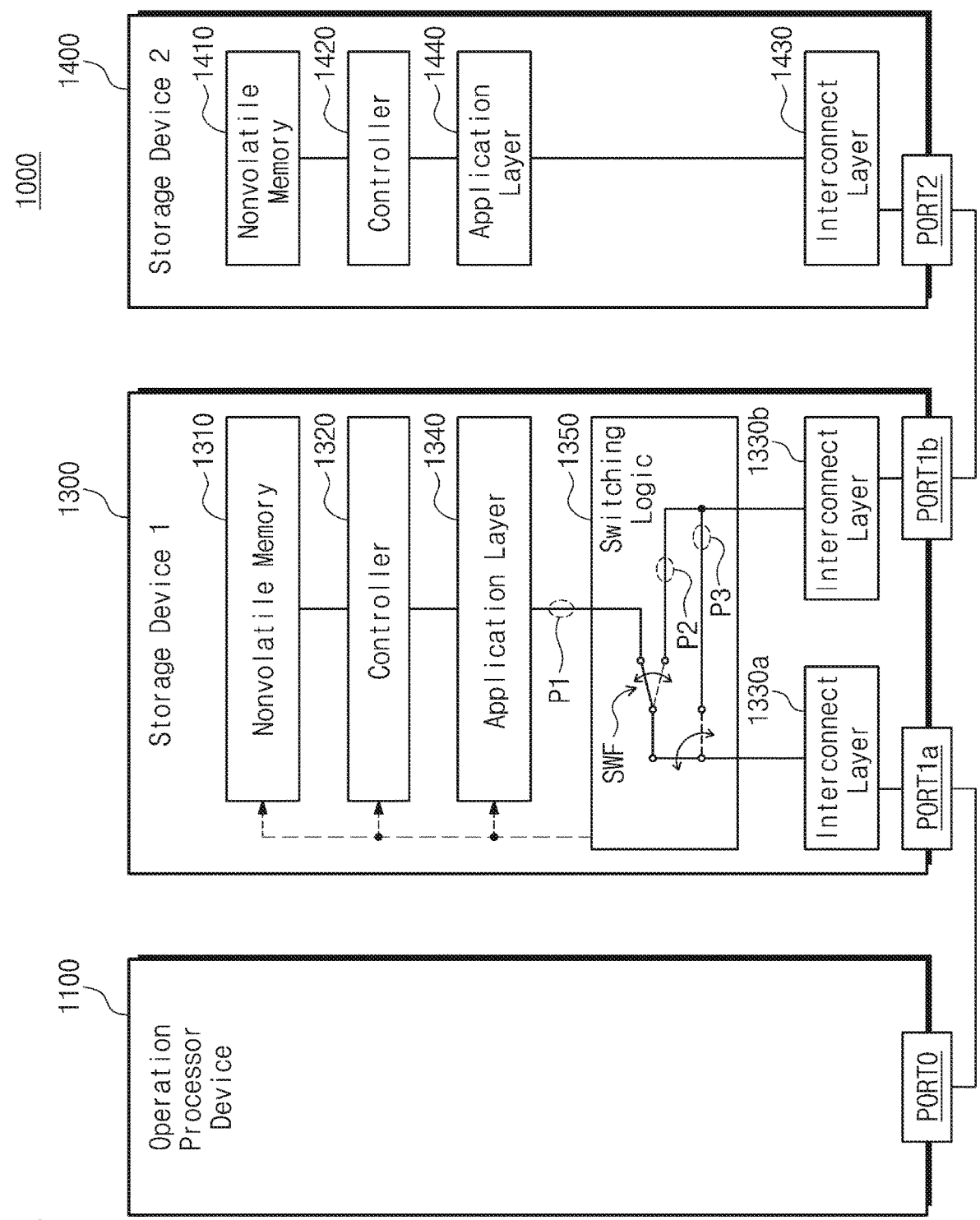
FIG. 3 is a block diagram for describing example configurations of storage devices of FIG. 1 and example communication in a storage system of FIG. 1.

FIG. 3 is a block diagram for describing example configurations of the storage devices 1300 and 1400 of FIG. 1 and example communication in the storage system 1000 of FIG. 1.

According to at least some example embodiments of the inventive concepts, the first storage device 1300 may further include interconnect layers 1330a and 1330b, an application layer 1340, and switching logic 1350. The interconnect layer 1330a may transmit and/or receive data, signals and/or packets through the port PORT1a, and the interconnect layer 1330b may transmit and/or receive data, signals and/or packets through the port PORT1b. The interconnect layers 1330a and 1330b may include physical layers and link layers that are defined in an interface protocol employed by the first storage device 1300. For example, the interconnect layers 1330a and 1330b may include various hardware components such as a transmitter/receiver circuit, a modulator/demodulator circuit, a converter circuit, a buffer circuit, and/or the like.

The application layer 1340 may comprehend and process various commands and/or packets of the interface protocol employed by the first storage device 1300. The application layer 1340 may provide a communication service on the first storage device 1300 by processing the interface protocol for the controller 1320. For example, the application layer 1340 may include various hardware circuits to process the interface protocol, and additionally or alternatively, may be implemented by an instruction set of a program code that is executed by a processor or processor core (e.g., a processor of the controller 1320).

According to at least some example embodiments of the inventive concepts, the second storage device 1400 may further include an interconnect layer 1430 and an application layer 1440. The interconnect layer 1430 may transmit and/or receive data, signals and/or packets through the port PORT2. The application layer 1440 may comprehend and process various instructions/packets of an interface protocol employed by the second storage device 1400. According to at least some example embodiments of the inventive concepts, the interconnect layer 1430 and the application layer 1440 may be configured to be similar to the interconnect layer 1330a and the application layer 1340 respectively. According to at least some example embodiments of the inventive concepts, the interconnect layer 1430 and the application layer 1440 may be configured to be similar to the interconnect layer 1330b and the application layer 1340 respectively.

FIG. 3 illustrates that the interconnect layers 1330a, 1330b, 1430 and the application layers 1340 and 1440 are independent components. However, such a configuration is provided to facilitate better understanding, and at least some example embodiments of the inventive concepts are not limited to the configuration illustrated in FIG. 3. For example, according to at least some example embodiments of the inventive concepts, the interconnect layers 1330a and 1330b and the application layer 1340 may be included in the controller 1320, and the interconnect layer 1430 and the application layer 1440 may be included in the controller 1420.

For example, when the operation processor device 1100 intends to communicate with the first storage device 1300 (e.g., to store data in the first storage device 1300 or to read data from the first storage device 1300), the operation processor device 1100 may provide a command and/or data to the application layer 1340 through the ports PORT0 and PORT1a and the interconnect layer 1330a. On the basis of information processed by the application layer 1340, the controller 1320 may store data in the nonvolatile memory 1310 or may read data from the nonvolatile memory 1310. The read data may be provided to the operation processor device 1100 through the interconnect layer 1330a and the ports PORT1a and PORT0.

Meanwhile, the operation processor device 1100 may intend to communicate with the second storage device 1400. However, since the operation processor device 1100 may not be directly connected with the second storage device 1400, the operation processor device 1100 may provide a command and/or data, which are configured for the second storage device 1400, to the first storage device 1300 through the ports PORT0 and PORT1a and the interconnect layer 1330a. The first storage device 1300 may transfer the provided command and/or data to the second storage device 1400 through the interconnect layer 1330b and the ports PORT1b and PORT2.

The second storage device 1400 may receive the command and/or data from the first storage device 1300 through the interconnect layer 1430. On the basis of information processed by the application layer 1440, the controller 1420 may store the data in the nonvolatile memory 1410 or may read data from the nonvolatile memory 1410. The read data may be provided to the first storage device 1300 through the interconnect layer 1430 and the ports PORT2 and PORT1b. The first storage device 1300 may receive the data from the second storage device 1400 through the port PORT1b and the interconnect layer 1330b. The first storage device 1300 may transfer the received data to the operation processor device 1100 through the interconnect layer 1330a and the ports PORT1a and PORT0.

The first storage device 1300 may process a command and/or data received from the operation processor device 1100 by itself, or may transfer the command and/or data to the second storage device 1400. The switching logic 1350 may provide a switching function SWF to provide a command and/or data from the operation processor device 1100 to the controller 1320 or to the second storage device 1400. FIG. 3 illustrates a switch element providing the switching function SWF, but at least some example embodiments of the inventive concepts are not limited thereto. A configuration of the switching logic 1350 may be variously changed or modified to provide the switching function SWF.

The switching logic 1350 may switch a first path P1 to the controller 1320 and a second path P2 to the second storage device 1400 between the interconnect layers 1330a and 1330b and the application layer 1340. When the first path P1 is provided, a command and/or data from the operation processor device 1100 may be processed in the first storage device 1300. On the other hand, when the second path P2 is provided, a command and/or data from the operation processor device 1100 may be transferred to the second storage device 1400 through the first storage device 1300.

To this end, the switching logic 1350 may determine whether a command and/or data received from the operation processor device 1100 is configured for the first storage device 1300 or for the second storage device 1400. The switching logic 1350 may switch the first path P1 and the second path P2 based on the determination result.

In some cases, the operation processor device 1100 may require only an operation to be performed on the second storage device 1400 without an operation to be performed on the first storage device 1300. In this case, operating components of the first storage device 1300 continuously may cause an increase in unnecessary power consumption. Thus, according to at least some example embodiments of the inventive concepts, when an operation to be performed on the first storage device 1300 is not required or, alternatively, desired, one or more components (e.g., circuits) of the first storage device 1300 may be disabled. In addition, the switching logic 1350 may provide a third path P3, instead of the first path P1 or the second path P2, to transfer a command and/or data to the second storage device 1400. This will be described with reference to FIGS. 4 to 8.

The switching logic 1350 may include various hardware circuits to provide the first path P1, the second path P2, and the third path P3, and additionally or alternatively, may be implemented by an instruction set of a program code executed by a processor core. In addition, FIG. 3 illustrates that the switching logic 1350 is an independent component, but according to at least some example embodiments of the inventive concepts, the switching logic 1350 may be included in the interconnect layers 1330a and 1330b and/or the application layer 1340.

Figure 4:
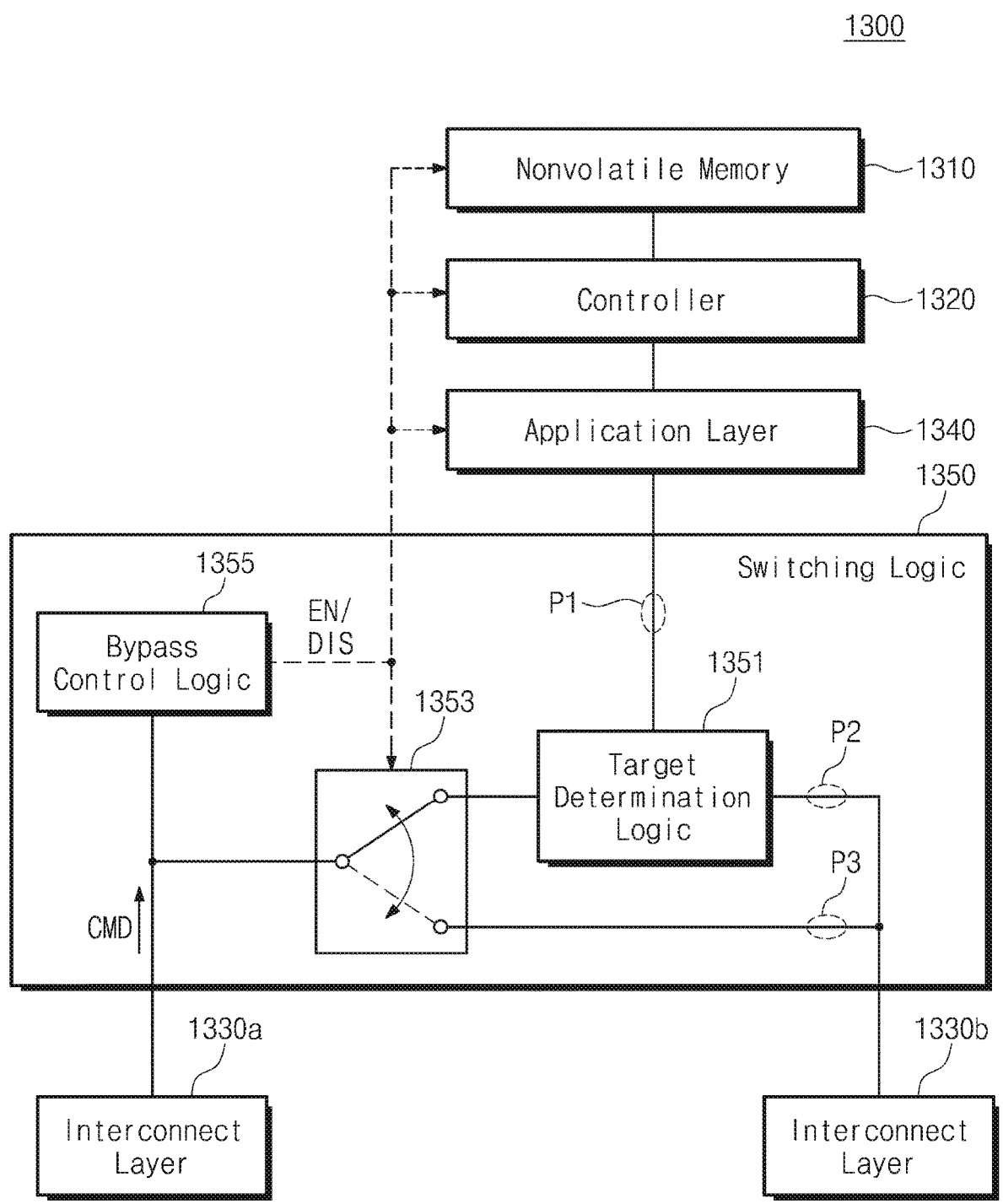
FIG. 4 is a block diagram for describing an example configuration and operations of switching logic included in a first storage device of FIG. 3.

FIG. 4 is a block diagram for describing an example configuration and operations of the switching logic 1350 included in the first storage device 1300 of FIG. 3.

According to at least some example embodiments of the inventive concepts, the switching logic 1350 may include target determination logic 1351, a selector 1353, and bypass control logic 1355. The target determination logic 1351 may determine whether a command and/or data received from the operation processor device 1100 is configured for the first storage device 1300 or for the second storage device 1400. An example determination operation will be described in more detail with reference to FIGS. 9A and 9B. The target determination logic 1351 may switch the first path P1 and the second path P2 based on the determination result. The target determination logic 1351 may provide the switching function SWF of FIG. 3.

The selector 1353 may select one of a connection to the target determination logic 1351 and a connection to the third path P3. FIG. 4 illustrates that the selector 1353 is a switch element, but a configuration of the selector 1353 may be variously changed or modified. Example configurations of the selector 1353 will be described in greater detail below with reference to FIGS. 10A and 10B.

For example, when an operation to be performed on the first storage device 1300 is not required or, alternatively, desired, the selector 1353 may select the connection to the third path P3. When the connection to the third path P3 is selected, the target determination logic 1351 may not receive a command and/or data from the operation processor device 1100. Accordingly, the target determination logic 1351 may not determine whether a command and/or data received from the operation processor device 1100 is configured for the controller 1320 of the first storage device 1300 or for the controller 1420 of the second storage device 1400. Instead, the third path P3 may allow a command and/or data from the operation processor device 1100 to be bypassed to the second storage device 1400.

Herein, the term "bypass" may mean that a command and/or data is transferred simply to a destination of the command and/or data directly without determining the destination. For example, when the connection to the third path P3 is selected, a command and/or data may bypass the target determination logic 1351 of the switching logic 1350 and then may detour to the second storage device 1400. Accordingly, the third path P3 may be understood as a bypass path.

On the other hand, when an operation to be performed on the first storage device 1300 is required or, alternatively, desired, the selector 1353 may select the connection to the target determination logic 1351. When the connection to the target determination logic 1351 is selected, the target determination logic 1351 may receive a command and/or data from the operation processor device 1100.

When it is determined that the received command and/or data is configured for the controller 1320 of the first storage device 1300, the target determination logic 1351 may transfer the received command and/or data to the first path P1. When it is determined that the received command and/or data is configured for the controller 1420 of the second storage device 1400, the target determination logic 1351 may transfer the received command and/or data to the second path P2.

The operation processor device 1100 may provide a command CMD to the first storage device 1300. Herein, even though the term "command" is used, the command CMD may be configured by any form (e.g., a command, a query, a request, or a packet) that may be generated by the operation processor device 1100.

The command CMD may include various types of commands. For example, the command CMD may include a normal command. The normal command may include a write command for a write operation, a read command for a read operation, a control command associated with controlling an operation condition of the interconnect layer 1330a, 1330b, or 1430, and/or the like. However, the "normal command" mentioned in the present disclosure is not limited to a specific "command", but may be associated with data and commands for write operations and read operations of the storage devices 1300 and 1400 as well as any other kinds of packets. The normal command may be transferred to the target determination logic 1351 or the third path P3 through the selector 1353.

For example, the command CMD may include an enable command and/or a disable command. For example, the operation processor device 1100 may provide the disable command to the first storage device 1300 when an operation to be performed on the second storage device 1400 is required or, alternatively, desired without an operation to be performed on the first storage device 1300. For example, the operation processor device 1100 may provide the enable command to the first storage device 1300 when an operation to be performed on the first storage device 1300 is required or, alternatively, desired. Since the operation processor device 1100 knows which storage device corresponds to a destination of the normal command, the operation processor device 1100 may prepare the enable command or the disable command in connection with the normal command.

The enable command and/or the disable command may be transferred to the bypass control logic 1355. The bypass control logic 1355 may control the selector 1353 based on the enable command and/or the disable command. In addition, the bypass control logic 1355 may be involved in controlling at least one of the nonvolatile memory 1310, the controller 1320, and/or the application layer 1340, based on the enable command and/or the disable command.

To this end, the bypass control logic 1355 may output an enable signal EN in response to the enable command, and may output a disable signal DIS in response to the disable command. The enable signal EN and/or the disable signal DIS may be provided to the selector 1353, the nonvolatile memory 1310, the controller 1320, and/or the application layer 1340.

The enable command and/or the disable command may be implemented in a command CMD together with the normal command. Alternatively, the enable command and/or the disable command may be implemented separately from the normal command. The enable command and the disable command may be implemented to have different values in one command, or may be implemented with separate commands. The enable command and/or the disable command may have the same data/packet format as that processed in the application layer 1340, or may have the same data/packet format as that processed in the interconnect layers 1330a and 1330b. Alternatively, the enable command and/or the disable command may be defined to have a new format. Implementation of the enable command and/or the disable command may be variously changed or modified.

FIG. 4 illustrates that the bypass control logic 1355 receives the enable command and/or the disable command through the interconnect layer 1330a. However, according to at least some example embodiments of the inventive concepts, the bypass control logic 1355 may be connected to a separate pin or path to receive the enable command and/or the disable command (e.g., a transmission path of the normal command may be different from a transmission path of the enable command and/or the disable command). According to at least some example embodiments of the inventive concepts, the bypass control logic 1355 may be provided separately from the switching logic 1350. Implementation of the bypass control logic 1355 may be variously changed or modified.

Operations that are based on the disable command will be further described with reference to FIGS. 5 and 6. Operations that are based on the enable command will be further described with reference to FIGS. 7 and 8.

Figure 5:
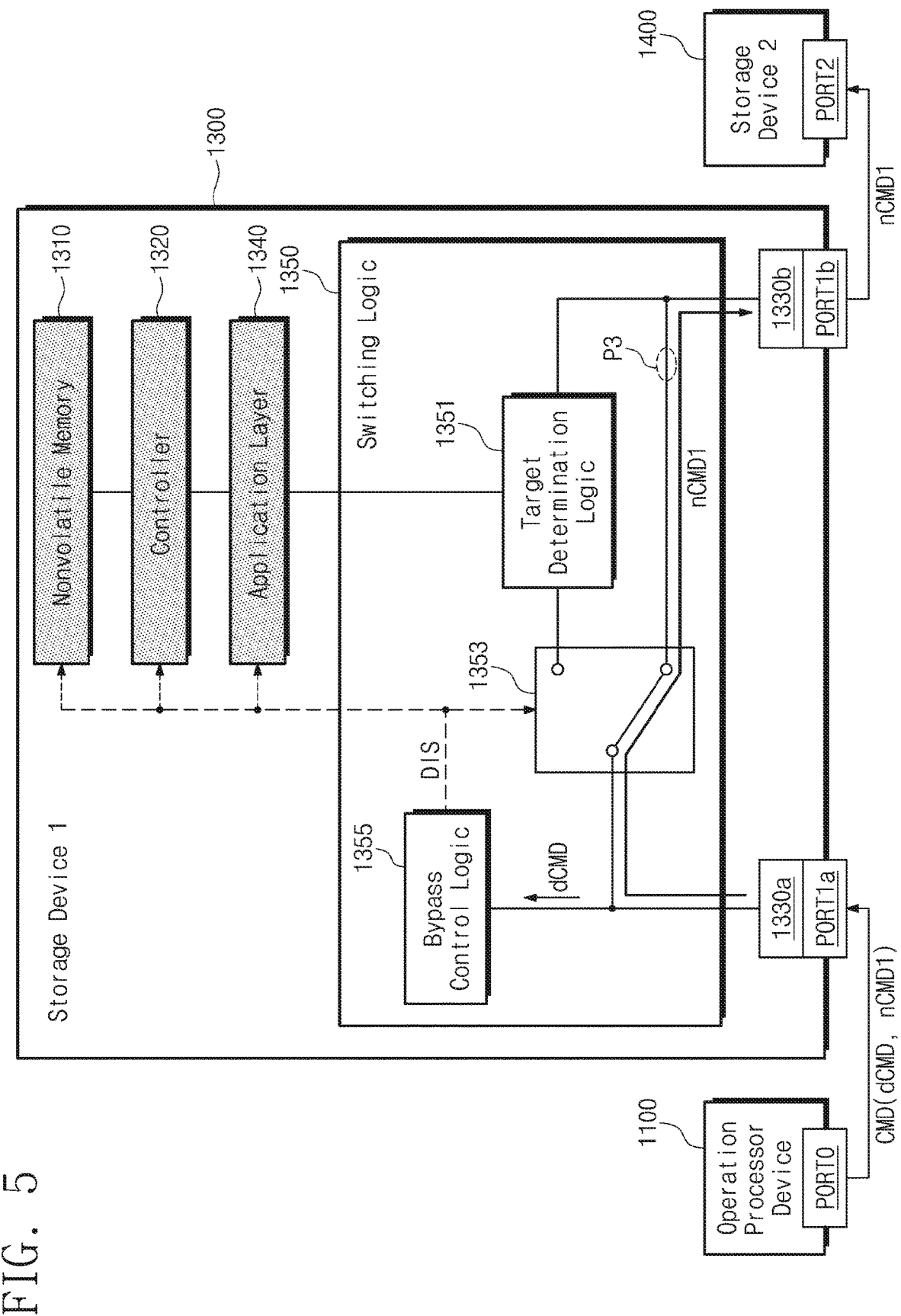
FIG. 5 is a conceptual diagram for describing example operations performed in response to a disable command in a storage system of FIG. 3.
Figure 6:
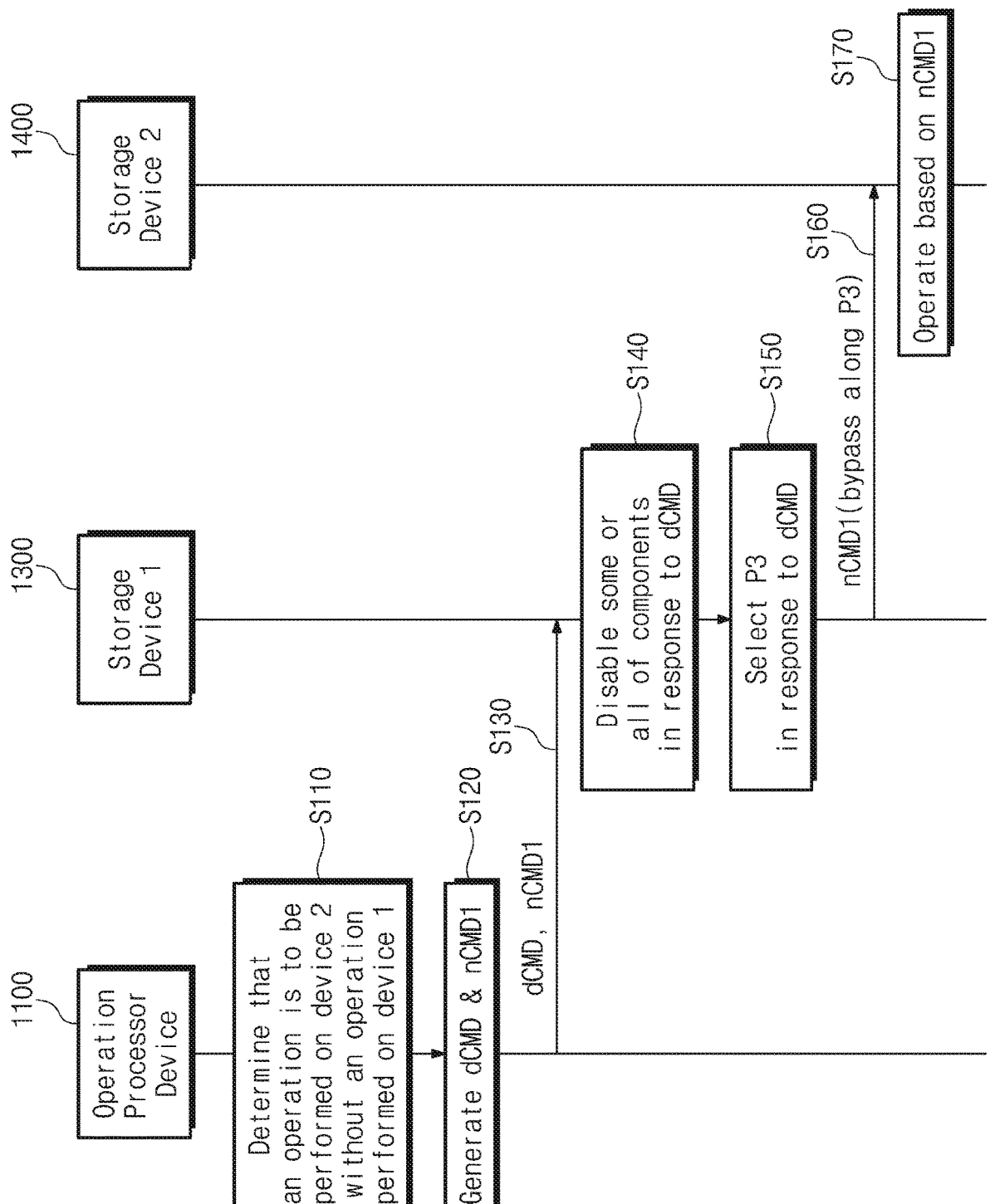
FIG. 6 is flowchart describing example operations performed in response to a disable command in a storage system of FIG. 3.

FIG. 5 is a conceptual diagram for describing example operations performed in response to a disable command in the storage system 1000 of FIG. 3. FIG. 6 is flowchart describing example operations performed in response to a disable command in the storage system 1000 of FIG. 3. To facilitate better understanding, FIGS. 5 and 6 will be referred to together.

In operation S110, the operation processor device 1100 may determine that only an operation to be performed on the second storage device 1400 is required without an operation on the first storage device 1300. In operation S120, the operation processor device 1100 may generate a normal command nCMD1. The normal command nCMD1 may be configured for the second storage device 1400, and may indicate an operation to be performed in the second storage device 1400. Since an operation to be performed on the first storage device 1300 is not being performed, the operation processor device 1100 may generate a disable command dCMD in connection with the normal command nCMD1.

In operation S130, the first storage device 1300 may receive the normal command nCMD1 and the disable command dCMD from the operation processor device 1100. The bypass control logic 1355 may generate the disable signal DIS in response to the disable command dCMD.

In operation S140, the bypass control logic 1355 may provide the disable signal DIS to at least one of the nonvolatile memory 1310, the controller 1320, and/or the application layer 1340. In some cases, the disable signal DIS may be provided to all of the nonvolatile memory 1310, the controller 1320, and the application layer 1340. In some cases, the disable signal DIS may be provided to only some of the nonvolatile memory 1310, the controller 1320, and the application layer 1340.

The bypass control logic 1355 may be involved in disabling the nonvolatile memory 1310, the controller 1320, and the application layer 1340 by means of the disable signal DIS. Herein, "disable" may be associated with decreasing the amount of power supplied to a specific component. For example, "disable" may be associated with interrupting power supply to a specific component (e.g., power-down), entering a stand-by/hibernate state to minimize stand-by power, and/or the like. Alternatively or additionally, "disable" may be associated with entering a disable state that is newly defined to decrease power consumption.

The disable command dCMD may decrease power consumption of all or some of components/circuits included in the first storage device 1300. Accordingly, when an operation to be performed on the first storage device 1300 is not required, power consumption of the first storage device 1300 may decrease.

For example, the bypass control logic 1355 may indirectly control supplying power to the nonvolatile memory 1310, the controller 1320, and the application layer 1340 by means of the disable signal DIS. Alternatively or additionally, the bypass control logic 1355 may directly control operation states of the nonvolatile memory 1310, the controller 1320, and the application layer 1340 by means of the disable signal DIS.

However, when an operation of a specific component is still required or, alternatively, desired, the bypass control logic 1355 may allow the specific component not to be disabled. For example, when an operation of the application layer 1340 is required or, alternatively, desired even though the disable command dCMD is received, the bypass control logic 1355 may not provide the disable signal DIS to the application layer 1340.

In operation S150, the bypass control logic 1355 may provide the disable signal DIS to the selector 1353. The bypass control logic 1355 may control the selector 1353 by means of the disable signal DIS such that a connection to the third path P3 is selected. Accordingly, when an operation to be performed on the first storage device 1300 is not required or, alternatively, desired, the normal command nCMD1 may be bypassed to the second storage device 1400 through the third path P3.

Consequently, in response to the disable command dCMD, a bypass path, through which the normal command nCMD1 and/or data are exchanged between the operation processor device 1100 and the second storage device 1400, may be provided. Meanwhile, when the third path P3 is provided, the target determination logic 1351 may not determine whether a command and/or data received from the operation processor device 1100 is configured for the first storage device 1300 or for the second storage device 1400. Accordingly, when an operation to be performed on the first storage device 1300 is not required or, alternatively, desired, a delay for transferring the normal command nCMD1 and data may be shortened.

In operation S160, the second storage device 1400 may receive the normal command nCMD1 bypassed through the third path P3. In operation S170, the second storage device 1400 may perform an operation indicated by the normal command nCMD1.

Figure 7:
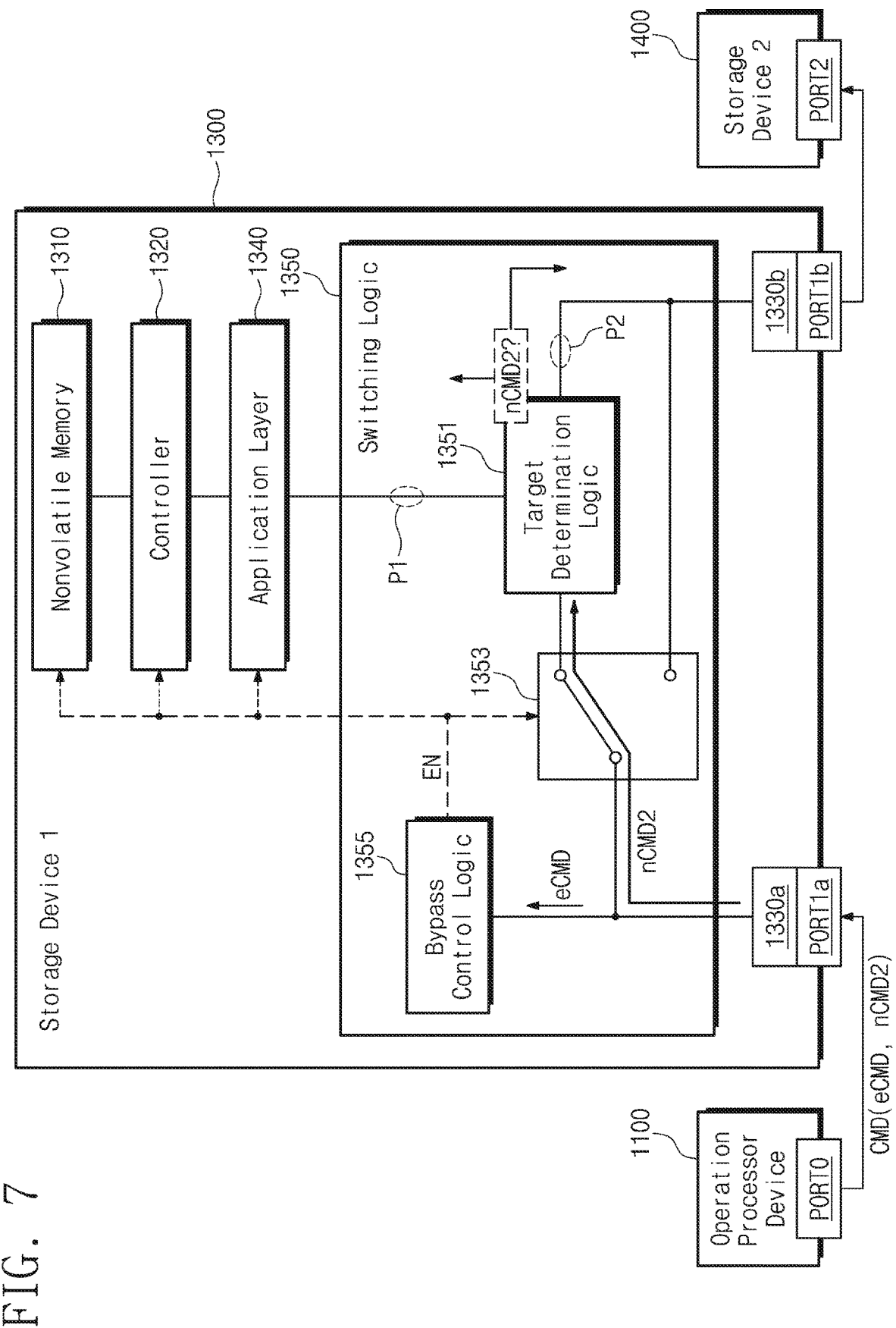
FIG. 7 is a conceptual diagram for describing example operations performed in response to an enable command in a storage system of FIG. 3.
Figure 8:
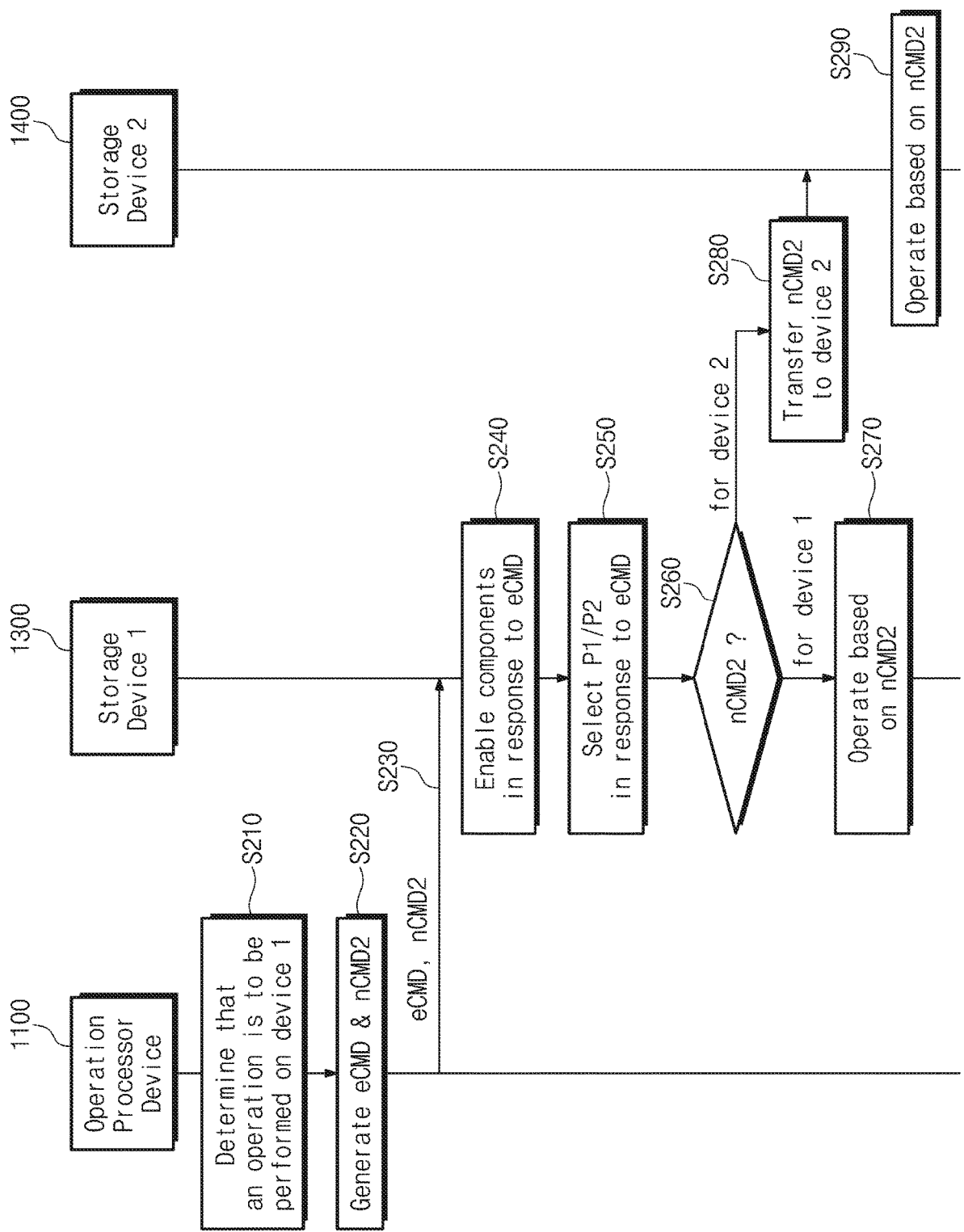
FIG. 8 is flowchart describing example operations performed in response to an enable command in a storage system of FIG. 3.

FIG. 7 is a conceptual diagram for describing example operations performed in response to an enable command in the storage system 1000 of FIG. 3. FIG. 8 is flowchart describing example operations performed in response to an enable command in the storage system 1000 of FIG. 3. To facilitate better understanding, FIGS. 7 and 8 will be referred to together.

In operation S210, the operation processor device 1100 may determine that an operation to be performed on the first storage device 1300 is required or, alternatively, desired. For example, the operation processor device 1100 may intend to fully operate components/circuits of the first storage device 1300 while all or some of components/circuits of the first storage device 1300 are disabled. In operation S220, the operation processor device 1100 may generate a normal command nCMD2. Since an operation to be performed on the first storage device 1300 is required or, alternatively, desired, the operation processor device 1100 may generate an enable command eCMD in connection with the normal command nCMD2.

In operation S230, the first storage device 1300 may receive the normal command nCMD2 and the enable command eCMD from the operation processor device 1100. The bypass control logic 1355 may generate the enable signal EN in response to the enable command eCMD.

In operation S240, the bypass control logic 1355 may provide the enable signal EN to at least one of the nonvolatile memory 1310, the controller 1320, and/or the application layer 1340. In some cases, the enable signal EN may be provided to all of the nonvolatile memory 1310, the controller 1320, and the application layer 1340. Alternatively, when the disable signal DIS has been provided to only some of the nonvolatile memory 1310, the controller 1320, and the application layer 1340, the enable signal EN may be provided only to the disabled component(s).

The bypass control logic 1355 may be involved in enabling the disabled component(s) by means of the enable signal EN. Herein, "enable" may be associated with increasing the amount of power decreased by the disable signal DIS. For example, "enable" may be associated with allowing a specific component to enter a normal operation state and supplying sufficient power to the specific component. The bypass control logic 1355 may directly or indirectly control the disabled component(s) by means of the enable signal EN.

In operation S250, the bypass control logic 1355 may provide the enable signal EN to the selector 1353. The bypass control logic 1355 may control the selector 1353 by means of the enable signal EN such that a connection to the target determination logic 1351 is selected. Accordingly, the third path P3 may be disconnected, and one of the first path P1 and the second path P2 may be provided. Consequently, when an operation to be performed on the first storage device 1300 is required or, alternatively, desired, the target determination logic 1351 may receive the normal command nCMD2.

In operation S260, the target determination logic 1351 may determine whether the normal command nCMD2 is configured for the first storage device 1300 or for the second storage device 1400. When the normal command nCMD2 is configured for the controller 1320 of the first storage device 1300, the target determination logic 1351 may transfer the normal command nCMD2 to the first path P1. Accordingly, in operation S270, the controller 1320 may receive the normal command nCMD2 under operation of the application layer 1340, and the first storage device 1300 may perform an operation indicated by the normal command nCMD2.

When the normal command nCMD2 is configured for the controller 1420 of the second storage device 1400, in operation S280, the target determination logic 1351 may transfer the normal command nCMD2 to the second storage device 1400 through the second path P2. Accordingly, in operation S290, the controller 1420 may receive the normal command nCMD2 under operation of the application layer 1440, and the second storage device 1400 may perform an operation indicated by the normal command nCMD2.

FIGS. 3, 4, and 7 illustrate that the second path P2 is directly connected from the switching logic 1350 to the interconnect layer 1330*b*. However, the connection of the second path P2 may be variously changed or modified. For example, when the application layer 1340 and/or the controller 1320 is required or, alternatively, desired to be involved in transferring the normal command nCMD2 to the second storage device 1400, the second path P2 may be connected to the interconnect layer 1330*b* through the application layer 1340 and/or the controller 1320.

Figure 9A:
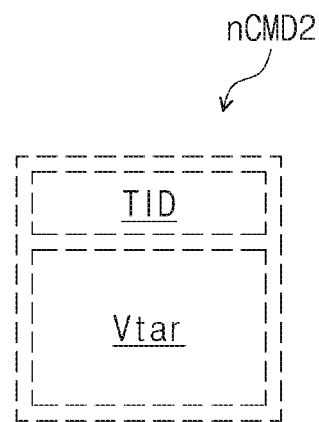
FIGS. 9A and 9B are conceptual diagrams for describing example configurations of a normal command to determine a destination of the normal command in a first storage device of FIG. 3.
Figure 9B:
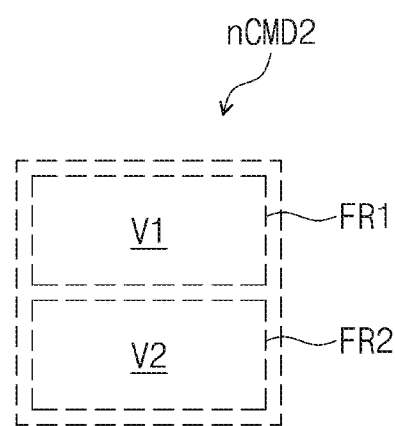

FIGS. 9A and 9B are conceptual diagrams for describing example configurations of a normal command to determine a destination of the normal command in the first storage device 1300 of FIG. 3.

Referring to FIG. 9A, according to at least some example embodiments of the inventive concepts, the normal command nCMD2 may include a field of a target identifier TID. In addition, the normal command nCMD2 may include fields of a value Vtar, which describes an operation to be performed on a storage device.

The target identifier TID may indicate which storage device is to receive the normal command nCMD2. An identifier of the first storage device 1300 may be different from an identifier of the second storage device 1400. The operation processor device 1100 may generate the normal command nCMD2 that includes an identifier indicating a storage device being a destination of the normal command nCMD2. Accordingly, the target determination logic 1351 may determine whether the normal command nCMD2 is configured for the first storage device 1300 or for the second storage device 1400, based on a value of the target identifier TID.

Referring to FIG. 9B, according to at least some example embodiments of the inventive concepts, the normal command nCMD2 may include a first field region FR1 and a second field region FR2. The first field region FR1 may include fields of a value V1 which describes an operation to be performed on the first storage device 1300, and the second field region FR2 may include fields of a value V2 which describes an operation to be performed on the second storage device 1400.

Index values of fields of the first field region FR1 may be different from index values of fields of the second field region FR2. For example, the fields of the first field region FR1 may have indexes of 1 to 100, and the fields of the second field region FR2 may have indexes of 101 to 200.

Accordingly, the target determination logic 1351 may determine whether the normal command nCMD2 is configured for the first storage device 1300 or for the second storage device 1400, based on index values of fields. For example, when the first field region FR1 does not include the value V1 and the second field region FR2 includes the value V2, the target determination logic 1351 may determine the normal command nCMD2 is configured for the second storage device 1400.

However, at least some example embodiments of the inventive concepts are not limited to the examples illustrated in FIGS. 9A and 9B. A configuration of the normal command nCMD2 may be variously changed or modified to determine a destination.

Figure 10A:
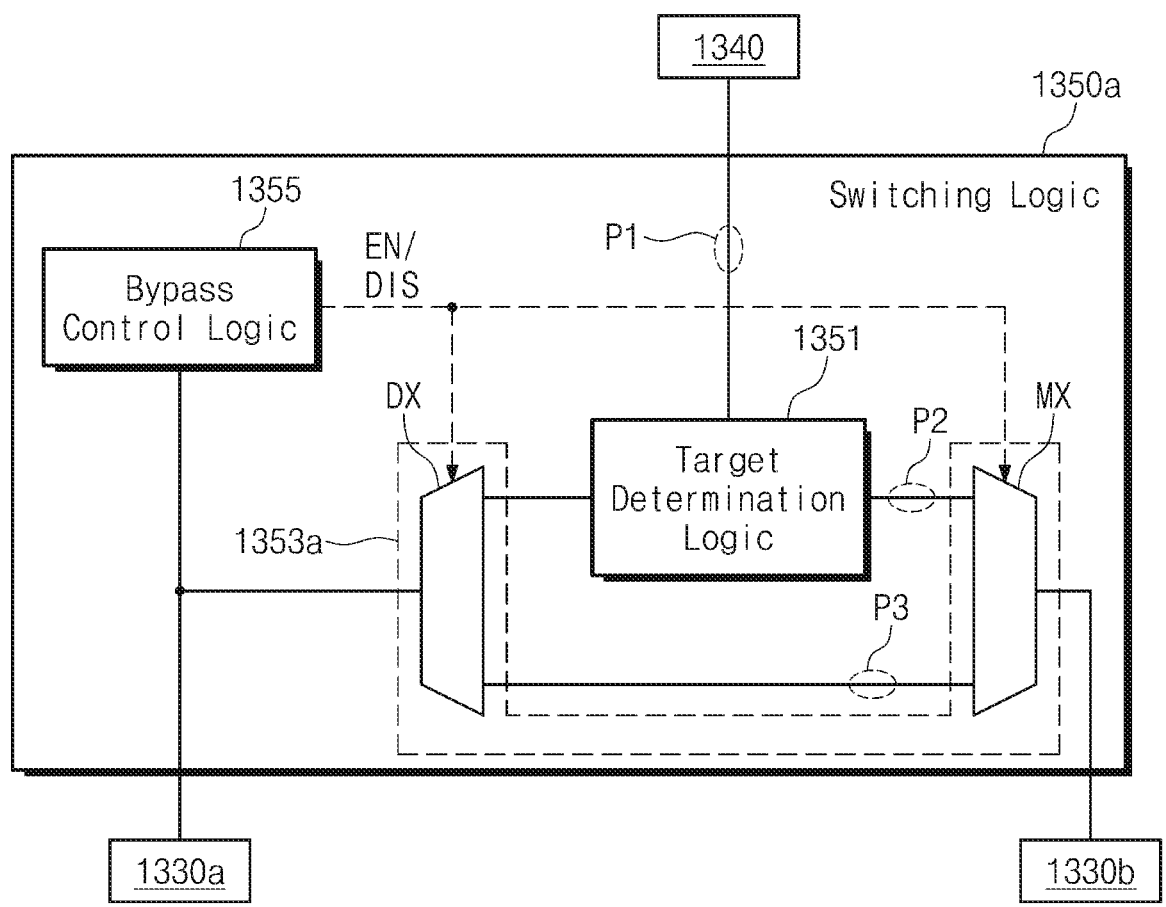
FIGS. 10A and 10B are block diagrams illustrating example configurations of switching logic of FIG. 3.
Figure 10B:
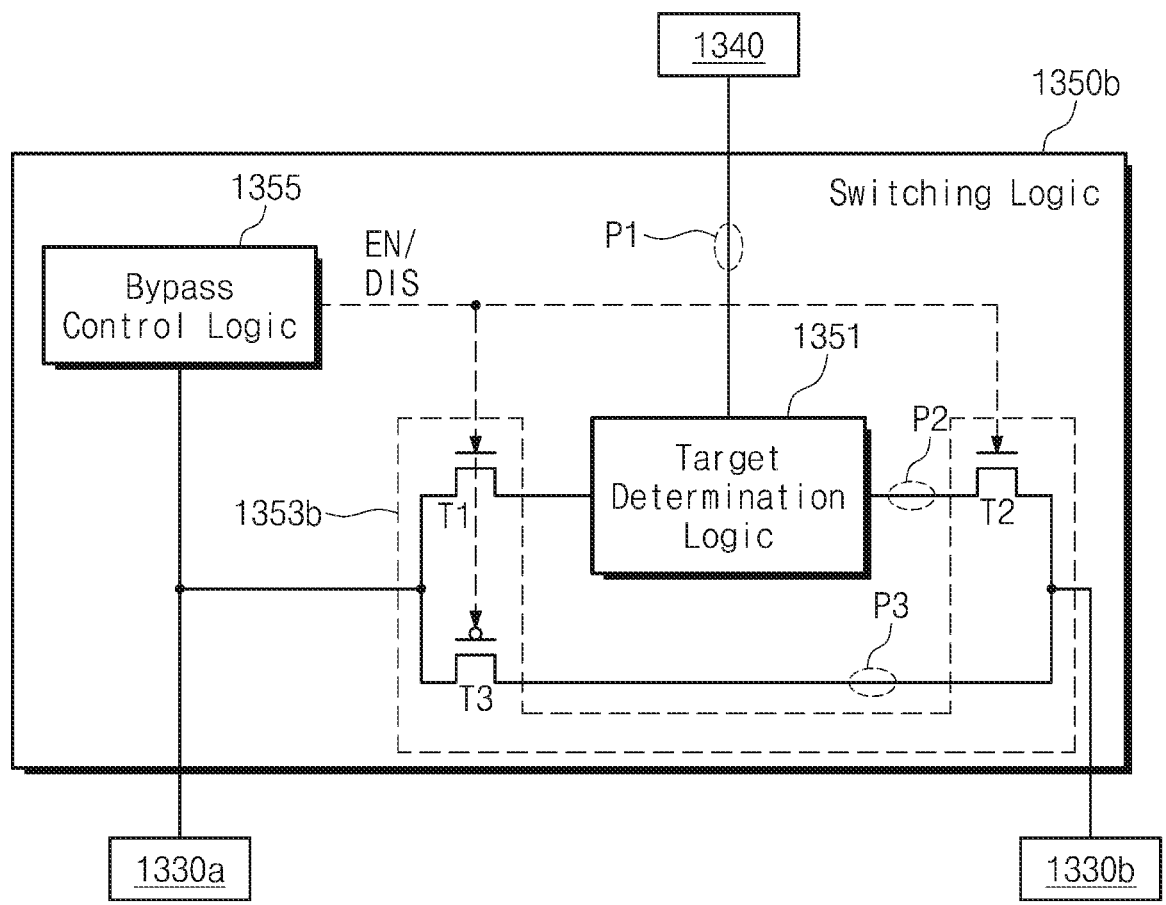

FIGS. 10A and 10B are block diagrams illustrating example configurations of the switching logic 1350 of FIG. 3. According to at least some example embodiments of the inventive concepts, the switching logic 1350 of FIG. 3 may include switching logic 1350*a* of FIG. 10A or switching logic 1350*b* of FIG. 10B. For brevity, redundant descriptions associated with the above-described components will be omitted below.

Referring to FIG. 10A, the switching logic 1350*a* may include the target determination logic 1351, a selector

1353*a*, and the bypass control logic 1355. For example, the selector 1353*a* may include a de-multiplexer DX and a multiplexer MX.

The de-multiplexer DX may selectively provide a connection to the target determination logic 1351 or a connection to the third path P3 in response to the enable signal EN or the disable signal DIS of the bypass control logic 1355. The multiplexer MX may selectively transfer a command/data/packet from the second path P2 or a command/data/packet from the third path P3 to the second storage device 1400 in response to the enable signal EN or the disable signal DIS of the bypass control logic 1355.

Referring to FIG. 10B, the switching logic 1350*b* may include the target determination logic 1351, a selector 1353*b*, and the bypass control logic 1355. For example, the selector 1353*b* may include transistors T1, T2, and T3.

The transistors T1 and T2 may provide the second path P2 passing through the target determination logic 1351, in response to the enable signal EN of the bypass control logic 1355. The transistor T3 may provide the third path P3 detouring the target determination logic 1351, in response to the disable signal DIS of the bypass control logic 1355.

However, at least some example embodiments of the inventive concepts are not limited to the examples illustrated in FIGS. 10A and 10B. A configuration of the switching logic 1350 may be variously changed or modified to provide the first path P1, the second path P2, and the third path P3.

Figure 11:
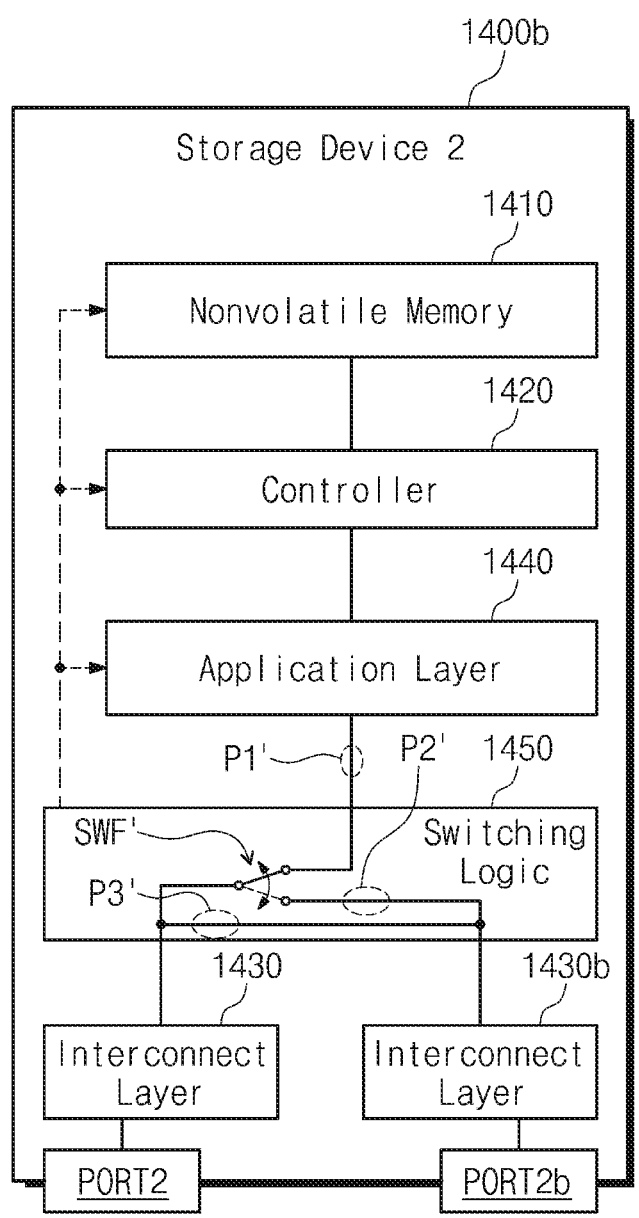
FIG. 11 is a block diagram illustrating an example configuration of a second storage device of FIG. 3.

FIG. 11 is a block diagram illustrating an example configuration of the second storage device 1400 of FIG. 3. For brevity, redundant descriptions associated with the above-described components will be omitted below.

The storage system 1000 described with reference to FIGS. 1 to 10B may include the two storage devices 1300 and 1400 that are serially connected to each other. However, according to at least some example embodiments of the inventive concepts, the storage system 1000 may include three or more storage devices (refer to FIG. 12) that are serially connected to each other. According to at least some example embodiments of the inventive concepts, when the storage system 1000 includes three or more storage devices that are serially connected to each other, the second storage device 1400 of FIG. 3 may include a second storage device 1400*b* of FIG. 11.

The second storage device 1400*b* may further include an interconnect layer 1430*b* and switching logic 1450 in addition to the nonvolatile memory 1410, the controller 1420, the interconnect layer 1430, and the application layer 1440. Similarly to the interconnect layer 1330*b* of FIG. 3, the interconnect layer 1430*b* may transmit and/or receive data, signals and/or packets through a port PORT2*b*. The port PORT2*b* may be directly connected with another storage device that is not directly connected with the operation processor device 1100 and the first storage device 1300.

Similarly to the switching logic 1350 of FIG. 3, the switching logic 1450 may provide a switching function SWF'. According to the switching function SWF', the switching logic 1450 may transfer a command and/or data from the first storage device 1300 to the controller 1420 or to the other storage device connected to the port PORT2*b*. To this end, the switching logic 1450 may switch a first path P1' to the controller 1420 and a second path P2' to the other storage device, according to the switching function SWF'.

Similarly to the switching logic 1350 of FIG. 3, the switching logic 1450 may provide a third path P3'. The third path P3' may provide a bypass path to the other storage device in response to a disable command when an operation to be performed on the second storage device 1400*b* is not required or, alternatively, desired. The disable command may be provided from the operation processor device 1100 through the first storage device 1300.

Figure 12:
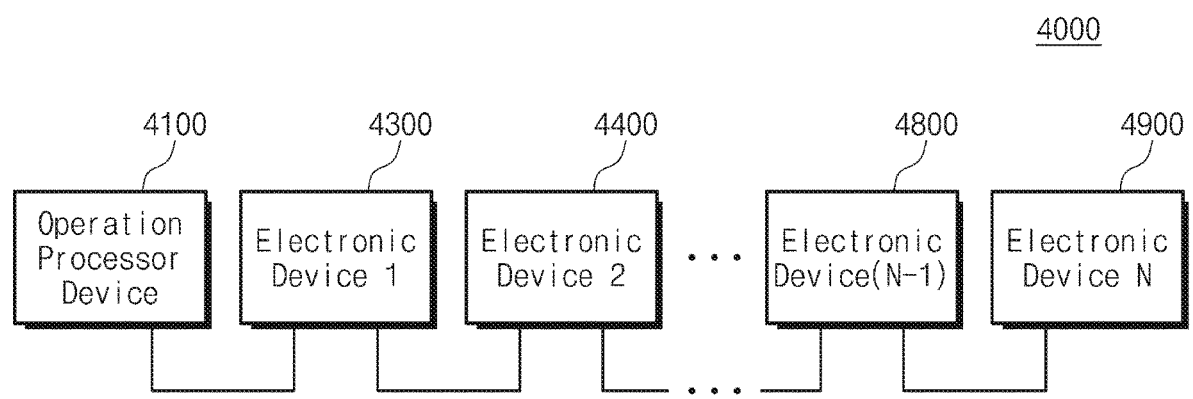
FIG. 12 is a block diagram illustrating an electronic system that includes serially connected electronic devices, according to at least some example embodiments of the inventive concepts.
Figure 13A:
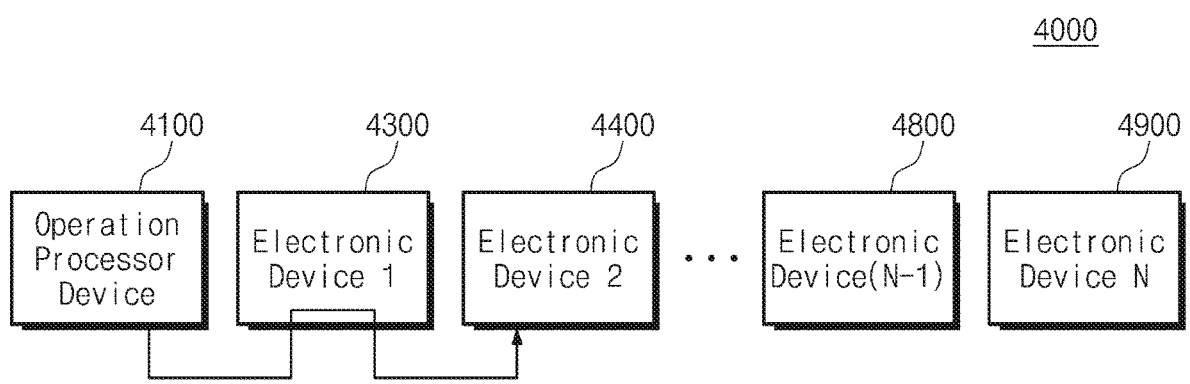
FIGS. 13A and 13B are conceptual diagrams for describing example processes of communicating with electronic devices that are not directly connected to an operation processor device in an electronic system of FIG. 12.
Figure 13B:
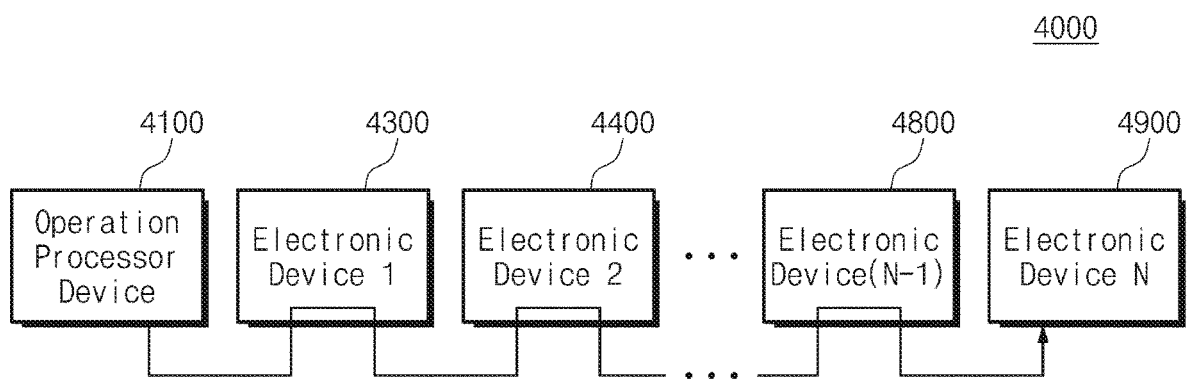

FIG. 12 is a block diagram illustrating an electronic system 4000 that includes serially connected electronic devices, according to at least some example embodiments of the inventive concepts. FIGS. 13A and 13B are conceptual diagrams for describing example processes of communicating with electronic devices that are not directly connected to an operation processor device 4100 in the electronic system 4000 of FIG. 12.

Referring to FIG. 12, the electronic system 4000 may include the operation processor device 4100 and a plurality of electronic devices 4300, 4400, 4800, and 4900 serially connected to the operation processor device 4100. The operation processor device 4100 may correspond to one of the processors 1100, 2100, and 3100 described with reference to FIGS. 1 to 11.

The electronic system 4000 may be one of various types of electronic systems. For example, the electronic system 4000 may correspond to the storage system 1000, the electronic device 2000, or the computing system 3000*a*, 3000*b*, or 3000*c* described with reference to FIGS. 1 to 11. For example, each of the electronic devices 4300, 4400, 4800, and 4900 may correspond to one of the storage devices 1300, 1400, 1400*b*, 2300, 2400, 3300*a*, 3300*b*, 3300*c*, 3400*a*, 3400*b*, and 3400*c* described with reference to FIGS. 1 to 11.

However, at least some example embodiments of the inventive concepts are not limited to the above examples. For example, each of the electronic devices 4300, 4400, 4800, and 4900 may include any type of electronic device such as a graphic processing device, a wired/wireless communication device, a display device, and/or the like. The use of the electronic system 4000 may be variously changed or modified according to a type of each of the electronic devices 4300, 4400, 4800, and 4900.

The electronic devices 4300, 4400, 4800, and 4900 may be serially connected to each other through respective input/output ports thereof. The first storage device 4300 may be at a tail end of the serial connection. The second electronic device 4400 may be connected to directly communicate with the first electronic device 4300. In this manner, the electronic devices 4300, 4400, 4800, and 4900 may be connected in the topology of a chain structure or a daisy-chain structure.

The operation processor device 4100 may be connected to directly communicate with the first electronic device 4300. However, the operation processor device 4100 may not be directly connected with other electronic devices 4400, 4800, and 4900. When the operation processor device 4100 intends to communicate with a target electronic device which is not directly connected to the operation processor device 4100, the operation processor device 4100 may communicate with the target electronic device through one or more intermediate electronic devices.

For example, referring to FIG. 13A, when the operation processor device 4100 intends to communicate with the second electronic device 4400, the operation processor device 4100 may communicate with the second electronic device 4400 through the first electronic device 4300. Meanwhile, when only an operation to be performed on the second electronic device 4400 is required or, alternatively, desired without an operation to be performed on the first electronic device 4300, the first electronic device 4300 may disable its component(s) and may provide a bypass path to the second electronic device 4400 in response to a disable command provided from the operation processor device 4100.

Accordingly, the first electronic device 4300 may receive a normal command indicating an operation to be performed on another electronic device (e.g., the second electronic device 4400) from the operation processor device 4100, and may make the received normal command bypassed to the other electronic device (e.g., the second electronic device 4400). When the normal command is configured for the second electronic device 4400, the second electronic device 4400 may perform an operation indicated by the normal command bypassing the first electronic device 4300.

Meanwhile, when an operation to be performed on the first electronic device 4300 is required or, alternatively, desired, the first electronic device 4300 may enable its component(s) and may disconnect the bypass path in response to an enable command provided from the operation processor device 4100. Afterwards, the first electronic device 4300 may perform an operation indicated by the normal command received from the operation processor device 4100.

For example, referring to FIG. 13B, when the operation processor device 4100 intends to communicate with the $N^{th}$ electronic device 4900, the operation processor device 4100 may communicate with the $N^{th}$ electronic device 4900 through the first to $(N-1)^{th}$ electronic devices 4300 to 4800. When only an operation to be performed on the $N^{th}$ electronic device 4900 is required or, alternatively, desired, the first to $(N-1)^{th}$ electronic devices 4300 to 4800 may disable their components and may provide a bypass path to the $N^{th}$ electronic device 4900 in response to the disable command provided from the operation processor device 4100. Accordingly, the $N^{th}$ electronic device 4900 may perform an operation indicated by the normal command bypassing the first to $(N-1)^{th}$ electronic devices 4300 to 4800.

To implement the electronic system 4000 of FIGS. 12, 13A, and 13B, the operation processor device 4100 and the electronic devices 4300, 4400, 4800, and 4900 may employ at least one of the configurations, operations, processes, methods, and/or communications described with reference to FIGS. 1 to 11. The operation processor device 4100 and the electronic devices 4300, 4400, 4800, and 4900 may employ at least one of various interface protocols such as USB, SCSI, PCIe, NVMe, SATA, SAS, SD card, eMMC, UFS, and/or the like, to communicate with each other. However, at least some example embodiments of the inventive concepts are not limited thereto.

Meanwhile, the electronic devices 4300, 4400, 4800, and 4900 may be independently controlled by the disable command. For example, components of the second electronic device 4400 may be disabled while components of the first and $N^{th}$ electronic devices 4300 and 4900 are enabled. Each of the electronic devices 4300, 4400, 4800, and 4900 may provide or may not provide a bypass path depending on whether an operation thereof is required or, alternatively, desired. For example, the enable command and/or the disable command may include a field of a target identifier and may be provided to an electronic device that the target identifier indicates.

Figure 14:
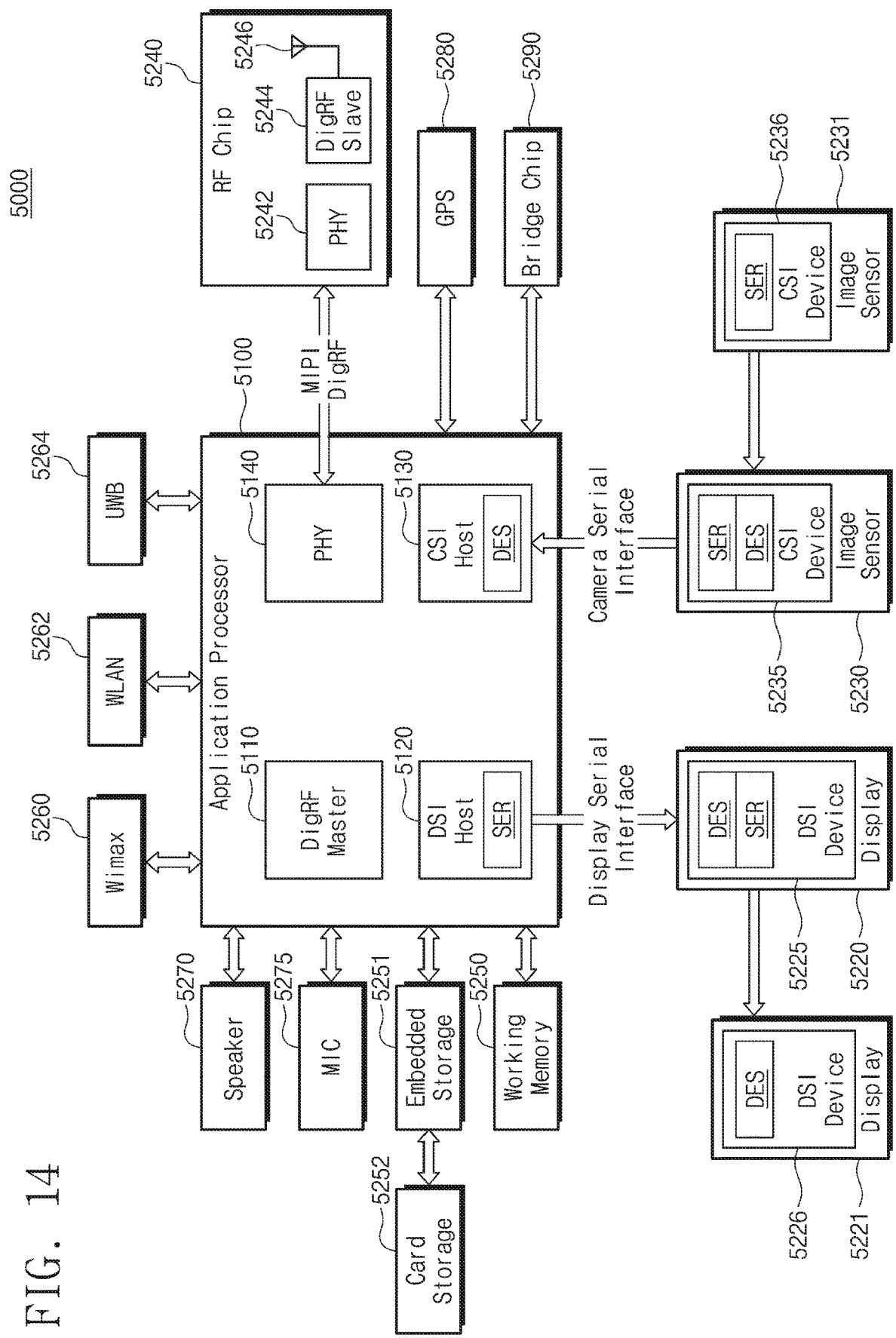
FIG. 14 is a block diagram illustrating an example configuration of an electronic device and interfaces thereof, according to at least some example embodiments of the inventive concepts.

FIG. 14 is a block diagram illustrating an example configuration of an electronic device and interfaces thereof, according to at least some example embodiments of the inventive concepts. An electronic device 5000 may be, for example, implemented in a data processing device which is capable of using or supporting an interface protocol proposed by MIPI® Alliance. For example, the electronic device 5000 may be one of electronic devices such as a portable communication terminal, a personal digital assistant (PDA), a portable multimedia player (PMP), a smart phone, a tablet computer, a wearable device, and/or the like.

The electronic device 5000 may include an application processor 5100, displays 5220 and 5221, and image sensors 5230 and 5231. The application processor 5100 may include a DigRF master 5110, a display serial interface (DSI) host 5120, a camera serial interface (CSI) host 5130, and a physical layer 5140.

The DSI host 5120 may communicate with a DSI device 5225 of the display 5220 in compliance with DSI. For example, a serializer SER may be implemented in the DSI host 5120, and a deserializer DES may be implemented in the DSI device 5225. The display 5220 may communicate with a DSI device 5226 of the display 5221 in compliance with DSI. For example, a serializer SER may be further implemented in the DSI device 5225, and a deserializer DES may be implemented in the DSI device 5226.

Meanwhile, the display 5221 may not be directly connected with the application processor 5100. Accordingly, the application processor 5100 may communicate with the DSI device 5226 of the display 5221 through the display 5220. For example, when an operation to be performed on the display 5220 is not required or, alternatively, desired, the display 5220 may disable its component(s) and may provide a bypass path to the display 5221 in response to a disable command provided from the application processor 5100.

The CSI host 5130 may communicate with a CSI device 5235 of the image sensor 5230 in compliance with CSI. For example, a deserializer DES may be implemented in the CSI host 5130, and a serializer SER may be implemented in the CSI device 5235. The image sensor 5230 may communicate with a CSI device 5236 of the image sensor 5231 in compliance with CSI. For example, a deserializer DES may be further implemented in the CSI device 5235, and a serializer SER may be implemented in the CSI device 5236.

Meanwhile, the image sensor 5231 may not be directly connected with the application processor 5100. Accordingly, the application processor 5100 may communicate with the CSI device 5236 of the image sensor 5231 through the image sensor 5230. For example, when an operation to be performed on the image sensor 5230 is not required or, alternatively, desired, the image sensor 5230 may disable its component(s) and may provide a bypass path to the image sensor 5231 in response to the disable command provided from the application processor 5100.

The electronic device 5000 may further include a radio frequency (RF) chip 5240 that communicates with the application processor 5100. The RF chip 5240 may include a physical layer 5242, a DigRF slave 5244, and an antenna 5246. For example, the physical layer 5242 of the RF chip 5240 and the physical layer 5140 of the application processor 5100 may exchange data with each other in compliance with DigRF interface proposed by MIPI® Alliance.

The electronic device 5000 may further include a working memory 5250, an embedded storage device 5251, and a card storage device 5252. The working memory 5250, the embedded storage device 5251, and the card storage device 5252 may store or output data for the application processor 5100.

The working memory 5250 may temporarily store data processed or to be processed by the application processor 5100. The working memory 5250 may include a volatile memory such as a static random access memory (SRAM), a dynamic RAM (DRAM), a synchronous DRAM (SDRAM), and/or the like, and/or a nonvolatile memory such as a flash memory, a phase-change RAM (PRAM), a magneto-resistive RAM (MRAM), a resistive RAM (ReRAM), a ferroelectric RAM (FRAM), and/or the like.

The embedded storage device 5251 and the card storage device 5252 may store data regardless of whether they are powered. For example, the embedded storage device 5251 and the card storage device 5252 may correspond to the embedded storage device 2300 and the removable storage device 2400 of FIG. 2 respectively.

The electronic device 5000 may communicate with an external device/system through a communication module, such as a worldwide interoperability for microwave access (WiMAX) 5260, a wireless local area network (WLAN) 5262, an ultra-wideband (UWB) 5264, and/or the like. Besides, the electronic device 5000 may communicate with the external device/system based on at least one of various wireless communication protocols, such as long term evolution (LTE), global system for mobile communication (GSM), code division multiple access (CDMA), Bluetooth, near field communication (NFC), wireless fidelity (Wi-Fi), radio frequency identification (RFID), and/or the like, and/or various wired communication protocols, such as transmission control protocol/Internet protocol (TCP/IP), USB, SCSI, mobile PCIe (M-PCIe), Firewire, and/or the like.

The electronic device 5000 may further include a speaker 5270 and a microphone 5275 for processing voice information. In addition, the electronic device 5000 may further include a global positioning system (GPS) device 5280 for processing position information. The electronic device 5000 may further include a bridge chip 5290 for managing connection with peripheral devices.

Figure 15:
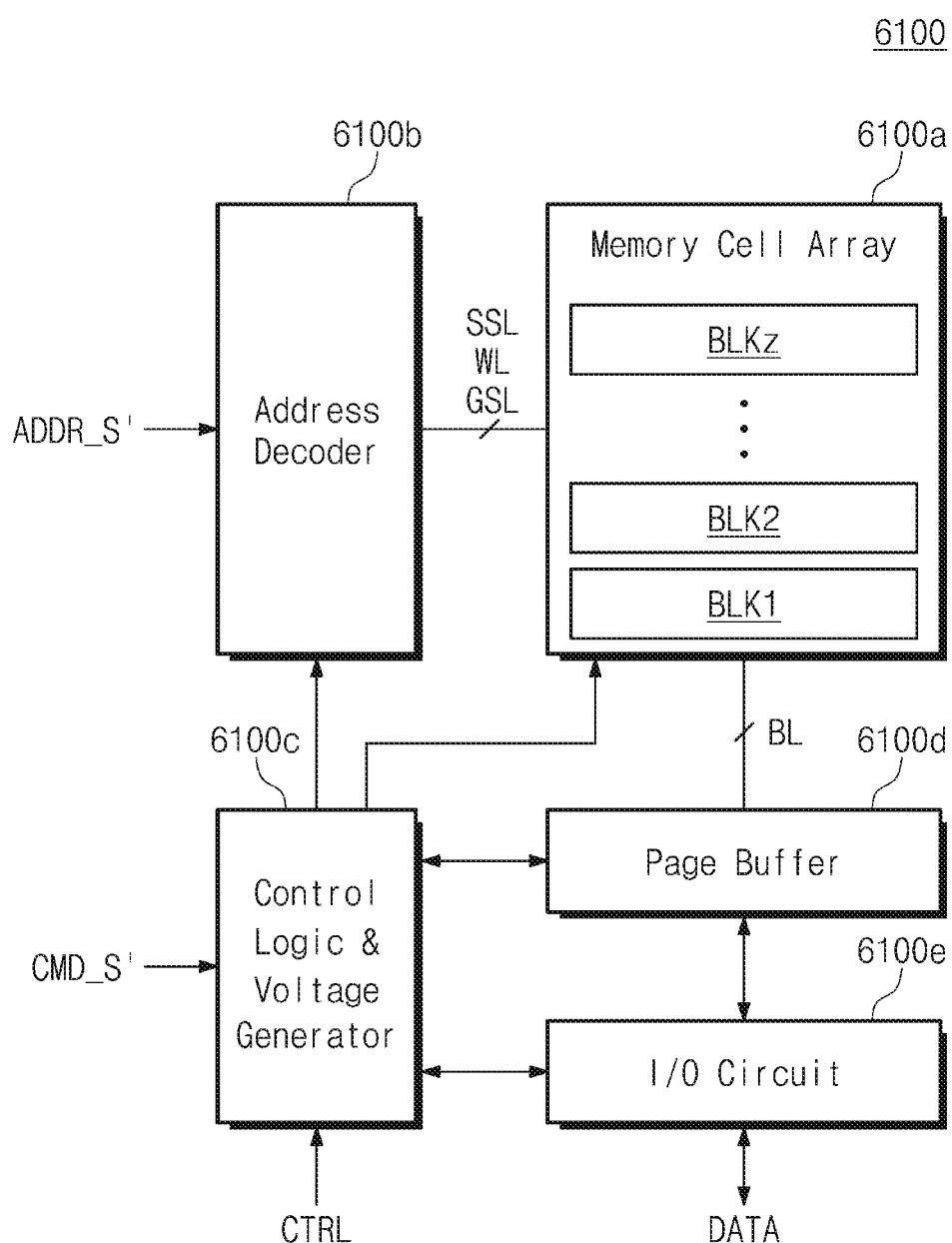
FIG. 15 is a block diagram illustrating one of nonvolatile memories of FIGS. 1 to 11.

FIG. 15 is a block diagram illustrating one of nonvolatile memories of FIGS. 1 to 11. At least one of the nonvolatile memory 1310 and 1410 may include a nonvolatile memory 6100. The nonvolatile memory 6100 may include a memory cell array 6100*a*, an address decoder 6100*b*, a control logic and voltage generator 6100*c*, a page buffer 6100*d*, and an input/output circuit 6100*e*. The control logic and voltage generator 6100*c* may also be referred to, in the present specification, as the control logic and voltage generator block 6100*c*.

The memory cell array 6100*a* may include a plurality of memory blocks BLK1 to BLKz. Each of the memory blocks BLK1 to BLKz may include a plurality of cell strings. Each of the cell strings may include a plurality of memory cells. The memory cells may be connected with a plurality of word lines WL respectively. Each memory cell may include a single level cell (SLC) storing one bit or a multi-level cell (MLC) storing at least two bits.

According to at least some example embodiments of the inventive concepts, the memory cell array 6100*a* may include a three-dimensional (3D) memory array. The 3D memory array may be monolithically formed in one or more physical levels of memory cell arrays having an active area arranged on a silicon substrate and a circuit related to an operation of memory cells. The circuit related to an operation of memory cells may be located in a substrate or on a substrate. The term "monolithic" may mean that layers of each level of the 3D memory array are directly deposited on layers of each lower level of the 3D memory array.

According to at least some example embodiments of the inventive concepts, the 3D memory array may include vertical NAND strings that are vertically oriented such that at least one memory cell is located over another memory cell. The at least one memory cell may include a charge trap layer. Each vertical NAND string may include at least one selection transistor located over memory cells. At least one selection transistor may have the same structure as the memory cells, and may be monolithically formed together with the memory cells.

The following patent documents, which are incorporated herein by reference, describe suitable configurations for 3D memory arrays, in which 3D memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

The address decoder 6100*b* may be connected with the memory cell array 6100*a* through the word lines WL, string selection lines SSL, and ground selection lines GSL The address decoder 6100*b* may decode an address ADDR_S' received from a controller (e.g., the controller 1320 or 1420 of FIG. 1). The address decoder 6100*b* may select at least one of the word lines WL based on the decoded address ADDR_S', and may drive the at least one selected word line.

The control logic and voltage generator 6100*c* may receive a command CMD_S' and a control signal CTRL from the controller (e.g., the controller 1320 or 1420 of FIG. 1). The control logic and voltage generator 6100*c* may control the address decoder 6100*b*, the page buffer 6100*d*, and the input/output circuit 6100*e* in response to the received signals. For example, the control logic and voltage generator 6100*c* may control the address decoder 6100*b*, the page buffer 6100*d*, and the input/output circuit 6100*e* in response to the command CMD_S' and the control signal CTRL such that write data provided from the controller (e.g., the controller 1320 or 1420 of FIG. 1) is stored in the memory cell array 6100*a* or such that read data stored in the memory cell array 6100*a* is read.

The control logic and voltage generator 6100*c* may generate various voltages used to operate the nonvolatile memory 6100. For example, the control logic and voltage generator 6100*c* may generate a plurality of program voltages, a plurality of pass voltages, a plurality of selection read voltages, a plurality of non-selection read voltages, a plurality of erase voltages, and a plurality of verification voltages. The control logic and voltage generator block 6100*c* may provide the generated voltages to the address decoder 6100*b* or to a substrate of the memory cell array 6100*a*.

The page buffer 6100*d* may be connected with the memory cell array 6100*a* through the bit lines BL. Under control of the control logic and voltage generator 6100*c*, the page buffer 6100*d* may control the bit lines BL such that write data provided from the input/output circuit 6100*e* are stored in the memory cell array 6100*a*. Under control of the control logic and voltage generator 6100*c*, the page buffer 6100*d* may read data stored in the memory cell array 6100*a* and may provide the read data to the input/output circuit 6100*e*. For example, the page buffer 6100*d* may receive data from the input/output circuit 6100*e* in unit of page, or may read data from the memory cell array 6100*a* in unit of page. According to at least some example embodiments of the inventive concepts, the page buffer 6100*d* may include data latches for temporarily storing data read from the memory cell array 6100*a* or data provided from the input/output circuit 6100*e*.

The input/output circuit 6100*e* may receive write data from an external device such as the controller 1320 or 1420, and may provide the write data to the page buffer 6100*d*. Alternatively, the input/output circuit 6100*e* may receive read data from the page buffer 6100*d*, and may provide the read data to an external device such as the controller 1320 or 1420. For example, the input/output circuit 6100*e* may exchange data DATA with the external device in synchronization with the control signal CTRL.

Figure 16:
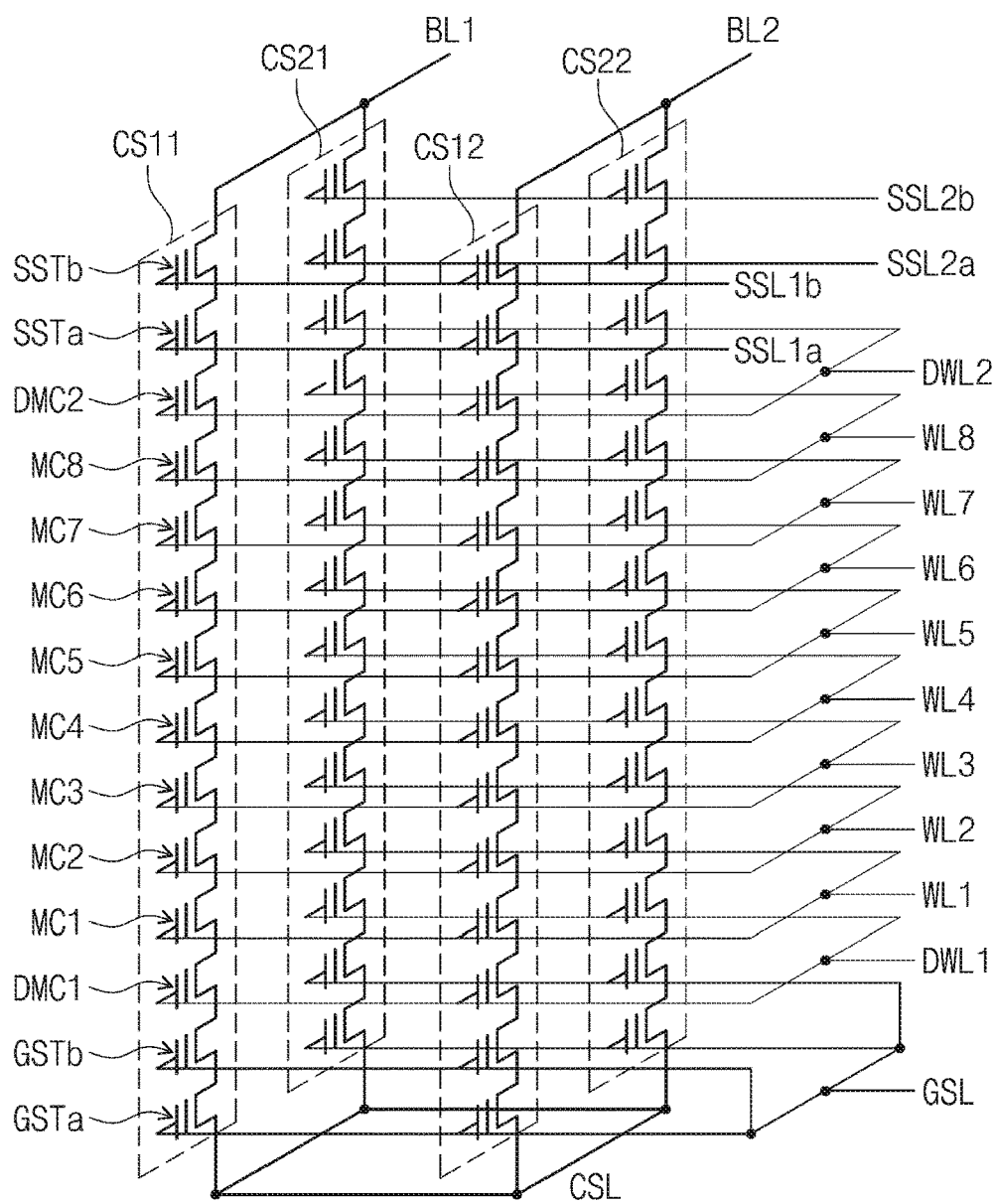
FIG. 16 is a conceptual diagram illustrating one memory block of a memory cell array in FIG. 15.
Figure 16:
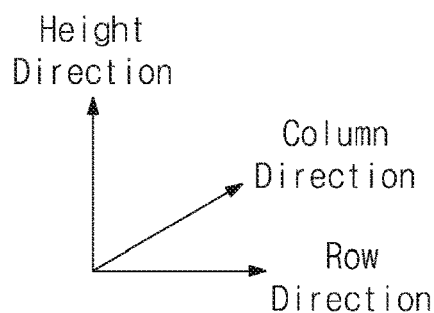

FIG. 16 is a conceptual diagram illustrating one memory block of the memory cell array in FIG. 15. A first memory block BLK1 of a 3D structure will be described with reference to FIG. 16. FIG. 16 illustrates that the memory cell array 6100a of FIG. 15 includes a NAND-type flash memory. However, at least some example embodiments of the inventive concepts are not limited to FIG. 16. Each of other memory blocks may be configured similarly to the first memory block BLK1.

The first memory block BLK1 may include a plurality of cell strings CS11, CS12, CS21, and CS22. The cell strings CS11, CS12, CS21, and CS22 may be arranged along a row direction and a column direction to constitute rows and columns. For example, the cell strings CS11 and CS12 may be connected to string selection lines SSL1a and SSL1b to constitute a first row. The cell strings CS21 and CS22 may be connected to string selection lines SSL2a and SSL2b to constitute a second row. For example, the cell strings CS11 and CS21 may be connected to a first bit line BL1 to constitute a first column. The cell strings CS12 and CS22 may be connected to a second bit line BL2 to constitute a second column.

Each of the cell strings CS11, CS12, CS21, and CS22 may include a plurality of cell transistors. For example, each of the cell strings CS11, CS12, CS21, and CS22 may include string selection transistor SSTa and SSTb, a plurality of memory cells MC1 to MC8, ground selection transistors GSTa and GSTb, and dummy memory cells DMC1 and DMC2. For example, each of the cell transistors included in the cell strings CS11, CS12, CS21, and CS22 may be a charge trap flash (CTF) memory cell.

The memory cells MC1 to MC8 may be serially connected, and may be stacked in a height direction being perpendicular to a plane defined by the row direction and column direction. The string selection transistors SSTa and SSTb may be serially connected, and may be arranged between the memory cells MC1 to MC8 and a bit line BL. The ground selection transistors GSTa and GSTb may be serially connected, and may be arranged between the memory cells MC1 to MC8 and a common source line CSL.

For example, a first dummy memory cell DMC1 may be arranged between the memory cells MC1 to MC8 and the ground selection transistors GSTa and GSTb. For example, a second dummy memory cell DMC2 may be arranged between the memory cells MC1 to MC8 and the string selection transistors SSTa and SSTb.

For example, the ground selection transistors GSTa and GSTb of the cell strings CS11, CS12, CS21, and CS22 may be connected in common to a ground selection line GSL, as illustrated in FIG. 16. However, in some other example, ground selection transistors in the same row may be connected to the same ground selection line, and ground selection transistors of different rows may be connected to different ground selection lines. For example, the first ground selection transistors GSTa of the cell strings CS11 and CS12 in the first row may be connected to the first ground selection line, and the first ground selection transistors GSTa of the cell strings CS21 and CS22 in the second row may be connected to the second ground selection line.

Memory cells at the same height from a substrate (or from the ground selection transistors GSTa and GSTb) may be connected in common to the same word line, and memory cells at different heights therefrom may be connected to different word lines. For example, the memory cells MC1 to MC8 of the cell strings CS11, CS12, CS21, and CS22 may be connected in common to first to eighth word lines WL1 to WL8, respectively.

String selection transistors, which belong to the same row, from among the first string selection transistors SSTa at the same height may be connected to the same string selection line, and string selection transistors belonging to different rows may be connected to different string selection lines. For example, the first string selection transistors SSTa of the cell strings CS11 and CS12 in the first row may be connected in common to the string selection line SSL1a, and the first string selection transistors SSTa of the cell strings CS21 and CS22 in the second row may be connected in common to the string selection line SSL2a.

Similarly, string selection transistors, which belong to the same row, from among the second string selection transistors SSTb at the same height may be connected to the same string selection line, and string selection transistors in different rows may be connected to different string selection lines. For example, the second string selection transistors SSTb of the cell strings CS11 and CS12 in the first row may be connected in common to a string selection line SSL1b, and the second string selection transistors SSTb of the cell strings CS21 and CS22 in the second row may be connected in common to a string selection line SSL2b.

Although not illustrated FIG. 16, string selection transistors of cell strings in the same row may be connected in common to the same string selection line. For example, the first and second string selection transistors SSTa and SSTb of the cell strings CS11 and CS12 in the first row may be connected in common to the same string selection line. The first and second string selection transistors SSTa and SSTb of the cell strings CS21 and CS22 in the second row may be connected in common to the same string selection line.

For example, dummy memory cells at the same height may be connected with the same dummy word line, and dummy memory cells at different heights may be connected with different dummy word lines. For example, the first dummy memory cells DMC1 may be connected to a first dummy word line DWL1, and the second dummy memory cells DMC2 may be connected to a second dummy word line DWL2.

In the first memory block BLK1, read and write operations may be performed by the row unit. For example, one row of the first memory block BLK1 may be selected by the string selection lines SSL1a, SSL1b, SSL2a, and SSL2b.

For example, the cell strings CS11 and CS12 in the first row may be respectively connected to the bit lines BL1 and BL2 when the turn-on voltage is supplied to the string selection lines SSL1a and SSL1b and the turn-off voltage is supplied to the string selection lines SSL2a and SSL2b. On the other hand, the cell strings CS21 and CS22 in the second row may be respectively connected to the bit lines BL1 and BL2 when the turn-on voltage is supplied to the string selection lines SSL2a and SSL2b and the turn-off voltage is supplied to the string selection lines SSL1a and SSL1b. When a word line is driven, memory cells, which are placed at the same height, from among memory cells in cell strings connected to the driven word line may be selected. Read and write operations may be performed with respect to the selected memory cells. The selected memory cells may constitute a physical page unit.

In the first memory block BLK1, memory cells may be erased in unit of memory block or sub-block. When erasing is performed in unit of memory block, all memory cells MC1 to MC8 in the first memory block BLK1 may be simultaneously erased according to an erase request. When erasing is performed in unit of sub-block, some of memory cells MC1 to MC8 in the first memory block BLK1 may be simultaneously erased according to an erase request, and the remaining memory cells may be erase-inhibited. A low voltage (e.g., a ground voltage) may be supplied to a word line connected to erased memory cells, and a word line connected to erase-inhibited memory cells may be floated.

A configuration of the first memory block BLK1 illustrated in FIG. 16 may be just an example. The number of cell strings may increase or decrease, and the number of rows of cell strings and the number of columns of cell strings may increase or decrease according to the number of cell strings. In addition, in the first memory block BLK1, the number of cell transistors (e.g., GST, MC, DMC, SST, and/or the like) may increase or decrease, and a height of the first memory block BLK1 may increase or decrease according to the number of cell transistors (e.g., GST, MC, DMC, SST, and/or the like). Moreover, the number of lines (e.g., GSL, WL, DWL, SSL, and/or the like) connected with cell transistors may increase or decrease according to the number of cell transistors (e.g., GST, MC, DMC, SST, and/or the like).

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An electronic device comprising:
   an embedded storage device that is,
      configured to connect to a removable storage device, and
      configured to directly communicate with the removable storage device,
      when connected to the removable storage device; and
   an application processor configured to directly communicate with the embedded storage device and not directly connected with the removable storage device,
   wherein, the embedded storage device is configured to, in response to a disable command received from the application processor without transferring the disable command to the removable storage device:
      decrease an amount of power supplied to all or some of circuits included in the embedded storage device, and
      provide a bypass path that is configured to transfer a normal command and data from the application processor to the removable storage device, when the removable storage device is connected to the bypass path,
   wherein the application processor is configured to transmit an enable command to the embedded storage device when the application processor determines that an operation is to be performed on the embedded storage device, and
   wherein the embedded storage device is further configured to disconnect the bypass path in response to the enable command.

2. The electronic device of claim 1, wherein:
   the application processor is configured to transmit the disable command to the embedded storage device when an operation is to be performed on the removable storage device without performing an operation on the embedded storage device.

3. The electronic device of claim 1, wherein:
   the embedded storage device is further configured to interrupt supplying power to all or some of the circuits in response to the disable command.

4. The electronic device of claim 1, wherein:
   the embedded storage device is further configured to, in response to the disable command, transmit the normal command and the data to the removable storage device through the bypass path without determining whether the normal command and the data are configured for the embedded storage device or for the removable storage device.

5. The electronic device of claim 1, wherein:
   the embedded storage device is further configured to increase the decreased amount of the power in response to the enable command.

6. The electronic device of claim 1, wherein:
   the embedded storage device is further configured to, in response to the enable command, determine whether the normal command and the data are configured for the embedded storage device or for the removable storage device.

7. The electronic device of claim 6, wherein, the embedded storage device is further configured to, in response to the enable command:
   perform an operation indicated by the normal command and the data when the normal command and the data are configured for the embedded storage device; and
   transfer the normal command and the data to the removable storage device when the normal command and the data are configured for the removable storage device.

8. A storage device comprising:
   a controller configured to directly communicate with each of a host device and an external storage device, the host device and the external storage device not being directly connected to each other;
   a nonvolatile memory configured to store write data or output read data, under control of the controller; and
   switching logic configured such that, in response to an enable command from the host device, the switching logic selectively switches between providing a normal command and data received from the host device to the controller through a first path and providing the normal command and the data received from the host device to the external storage device through a second path,
   wherein, the switching logic is further configured such that, in response to a disable command received from the host device without transferring the disable command to the external storage device, the switching logic:
      disables at least one of the controller or the nonvolatile memory, and
      provides the normal command and the data to the external storage device through a third path different from the first and second paths,
   wherein the switching logic includes
      target determination logic configured to selectively switch between the first path and the second path;
      a selector configured to selectively switch between a first connection to the target determination logic and a second connection to the third path, such that the normal command and the data are transferred to the target determination logic or the third path: and
      bypass control logic configured to control the selector based on the enable command and the disable command.

9. The storage device of claim 8, wherein:
the bypass control logic is further configured to control the selector such that the selector selects the first connection in response to the enable command, and
the target determination logic is further configured to receive the normal command and the data through the first connection.

10. The storage device of claim 9, wherein, the target determination logic is further configured such that, when the first connection is provided, the target determination logic:
transfers the normal command and the data to the first path when the normal command and the data are configured for the controller, and
transfers the normal command and the data to the second path when the normal command and the data are configured for the external storage device.

11. The storage device of claim 8, wherein:
the bypass control logic is further configured to control the selector to select the second connection in response to the disable command, and
the switching logic is further configured to transmit the normal command and the data to the external storage device through the second connection and the third path.

12. The storage device of claim 11, wherein:
the target determination logic is configured such that, when the second connection is provided, the target determination logic does not determine whether the normal command and the data are configured for the controller or for the external storage device.

13. An electronic device comprising:
a processor;
one or more first signal lines;
a first storage device that includes one or more circuits and is connected to the processor by the one or more first signal lines; and
one or more second signal lines that are connected to the first storage device and connectable to a second storage device,
the first storage device including switching logic configured to selectively transfer signals received from the processor to a first path or a second path, the first path being connectable to the one or more circuits, the second path being connected to the one or more second signal lines,
the first storage device being configured such that, based on receiving a disable command from the processor without transferring the disable command to the second storage device,
the first storage device reduces an amount of power received by at least one of the one or more circuits,
the switching logic selects the second path, and
the switching logic transfers at least one of commands and data received from the processor to the second storage device through the second path, when the second storage device is connected to the one or more second signal lines,
wherein the processor is configured to transmit an enable command to the first storage device through the one or more first signals when the processor determines that an operation is to be performed on the first storage device, and
wherein the first storage device is further configured to disconnect the second path in response to the enable command.

14. The electronic device of claim 13, wherein the switching logic comprises:
a target determination logic connected to the first path,
the first storage device being configured such that, based on receiving an enable command from the processor, the switching logic selects the first path such that at least one of commands and data received at the switching logic from the processor are transferred to the target determination logic via the first path.

15. The electronic device of claim 14, wherein the target determination logic is configured to,
receive the at least one of the commands and data transferred to the target determination logic via the first path, and
selectively transfer the received at least one of the commands and data to a third path or a fourth path,
the third path being connected to the one or more circuits,
the fourth path being connected to the second storage device via the one or more second signal lines, when the second storage device is connected to the one or more second signal lines.

16. The electronic device of claim 13, wherein the switching logic comprises:
a selector configured to selectively output the at least one of the commands and data received from the processor to one of the first path and the second path.

17. The electronic device of claim 13, wherein the electronic device is configured such that the second storage device is insertable and removable with respect to the electronic device.

* * * * *